United States Patent
Li et al.

(10) Patent No.: US 11,863,799 B2
(45) Date of Patent: Jan. 2, 2024

(54) IMAGE ENCODING METHOD AND APPARATUS, IMAGE DECODING METHOD AND APPARATUS, AND CHIP

(71) Applicant: HUAWEI TECHNOLOGIES CO., LTD., Guangdong (CN)

(72) Inventors: Bin Li, Shenzhen (CN); Ling Liu, Shenzhen (CN); Hui Shen, Shenzhen (CN); Jiaqi Gu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 17/674,676

(22) Filed: Feb. 17, 2022

(65) Prior Publication Data

US 2022/0174329 A1   Jun. 2, 2022

Related U.S. Application Data

(63) Continuation of application No. PCT/CN2020/107673, filed on Aug. 7, 2020.

(30) Foreign Application Priority Data

Aug. 19, 2019   (CN) .......................... 201910766066.4

(51) Int. Cl.
   *H04B 1/00* (2006.01)
   *H04N 19/93* (2014.01)
   (Continued)

(52) U.S. Cl.
   CPC .......... *H04N 19/93* (2014.11); *H04N 19/124* (2014.11); *H04N 19/91* (2014.11)

(58) Field of Classification Search
   CPC . H04B 1/00; H03M 7/40; H03M 7/42; H04N 19/13; H04N 19/18; H04N 19/91; H04N 19/60; H04N 19/124
   (Continued)

(56) References Cited

U.S. PATENT DOCUMENTS

2001/0011959 A1*   8/2001   Hirano .................... H03M 7/40
                                                                341/65
2004/0184544 A1*   9/2004   Kondo ................. H04N 19/196
                                                                375/E7.161
(Continued)

FOREIGN PATENT DOCUMENTS

CN          1656690 A      8/2005
CN        101198056 A      6/2008
(Continued)

OTHER PUBLICATIONS

Office Action issued in Chinese Application No. 201910766066.4 dated Nov. 25, 2021, 17 pages (with English translation).

(Continued)

*Primary Examiner* — Khai Tran
(74) *Attorney, Agent, or Firm* — Fish & Richardson P.C.

(57) ABSTRACT

The disclosure provides image encoding methods and apparatuses. One example encoding method includes: obtaining a one-dimensional sequence of quantized coefficients of an image; obtaining a run-length value sequence and a level value sequence based on the one-dimensional sequence of the quantized coefficients; obtaining an updated second distribution probability of each level value in the level value sequence based on the m first distribution probabilities, the n second distribution probabilities, and a preset mapping rule; and performing encoding based on the level value sequence and the updated second distribution probability of each level value in the level value sequence to obtain and output encoded image data.

20 Claims, 15 Drawing Sheets

(51) Int. Cl.
H04N 19/124 (2014.01)
H04N 19/91 (2014.01)

(58) Field of Classification Search
USPC .......................................... 375/130; 341/65
See application file for complete search history.

(56) References Cited

U.S. PATENT DOCUMENTS

| | | | |
|---|---|---|---|
| 2005/0012647 A1* | 1/2005 | Kadono | H03M 7/4006 |
| | | | 375/E7.129 |
| 2005/0254583 A1* | 11/2005 | Kim | G06T 9/20 |
| | | | 375/E7.199 |
| 2007/0200737 A1 | 8/2007 | Gao et al. | |
| 2012/0069899 A1 | 3/2012 | Mehrotra et al. | |
| 2012/0082230 A1 | 4/2012 | Karczewicz et al. | |
| 2016/0373749 A1 | 12/2016 | Fuldseth et al. | |
| 2016/0373766 A1 | 12/2016 | Fuldseth et al. | |
| 2018/0213258 A1 | 7/2018 | Xu et al. | |

FOREIGN PATENT DOCUMENTS

| | | |
|---|---|---|
| CN | 101572814 A | 11/2009 |
| CN | 102438145 A | 5/2012 |
| CN | 102682810 A | 9/2012 |
| CN | 103200407 A | 7/2013 |
| CN | 104349168 A | 2/2015 |
| CN | 106559179 A | 4/2017 |
| EP | 1424856 B1 | 2/2007 |
| WO | 03084076 A1 | 10/2003 |
| WO | 2012030445 A1 | 3/2012 |
| WO | 2016209757 A1 | 12/2016 |

OTHER PUBLICATIONS

Shuyuan, "Research on Quantization Coding Method for Color Image Compression," Software Guide, vol. 14, No. 7, Jul. 2015, 4 pages (with English abstract).

Waingankar et al., "Effective Video Compression Technique Using Modified Run Length Encoding," International Conference on Signal Processing (ICSP 2016), Nov. 2016, 6 pages.

Wang et al., "Context-Based 2D-VLC Entropy Coder in AVS Video Coding Standard," Journal of Computer Science and Technology, May 2006, vol. 21, No. 3, 8 pages.

Extended European Search Report in European Appln No. 20853918.9, dated Sep. 21, 2022, 11 pages.

* cited by examiner

IMAGE ENCODING METHOD AND APPARATUS, IMAGE DECODING METHOD AND APPARATUS, AND CHIP

CROSS-REFERENCE TO RELATED APPLICATIONS

This application is a continuation of International Application No. PCT/CN2020/107673, filed on Aug. 7, 2020, which claims priority to Chinese Patent Application No. 201910766066.4, filed on Aug. 19, 2019. The disclosures of the aforementioned applications are hereby incorporated by reference in their entireties.

TECHNICAL FIELD

This application relates to the field of image processing and compression, and more specifically, to an image encoding method and apparatus, an image decoding method and apparatus, and a chip.

BACKGROUND

Image coding, namely, image compression, is to eliminate all kinds of redundancy in image data to represent image information by using as few bits as possible while ensuring specific reconstruction quality. Image compression coding technologies can be traced back to researches on digital transmission of television signals in the communications industry in 1984, with more than 30 years of history up to now. International coding standards such as JPEG, JPEG2000, MPEG-1, MPEG-2, MPEG-4, H.261, and H.263 have gained great success, and new image coding methods are still emerging.

Digital image signals have been widely used in people's daily life, and have become one of the most common multimedia signals. In an image coding technology, image data is compressed by eliminating spatial redundancy in a raw image signal. This effectively reduces an amount of data required for representing an image. However, quality of the image is affected while the data amount of the image is reduced. Usually, a higher compression ratio of the image results in greater loss of the quality. An efficient image coding algorithm requires that relatively high quality of a compressed image be ensured while a high compression ratio is implemented. With continuous development of modern electronic information technologies, people pose increasingly high requirements on image resolution and fidelity. In addition, larger storage space and higher network bandwidth are required for storing and transmitting a high-resolution and high-fidelity image. How to effectively reduce an amount of data for representing an image to effectively store and transmit a high-resolution and high-fidelity image with limited storage space and bandwidth is a problem that urgently needs to be resolved in the image compression field.

SUMMARY

This application provides an image encoding method and apparatus, an image decoding method and apparatus, and a chip, to effectively reduce an amount of data for representing an image and improve image compression efficiency, without increasing complexity of encoding and decoding, so that implementation is simple. The following describes the summary of this application from a plurality of aspects, making it easy to understand. Mutual reference may be made between the following plurality of aspects and between implementations of the plurality of aspects.

According to a first aspect, this application provides an image encoding method. The method includes: obtaining a one-dimensional sequence of quantized coefficients of an image, where the one-dimensional sequence is obtained by scanning a two-dimensional matrix of the quantized coefficients; obtaining a run-length value sequence and a level value sequence based on the one-dimensional sequence of the coefficients, where the run-length value sequence is $N=\{N_0, N_1, N_2, \ldots, N_{m-1}\}$, the level value sequence is $a=\{a_0, a_1, a_2, \ldots, a_{n-1}\}$, both m and n are positive integers, each run-length value in the run-length value sequence corresponds to one value distribution probability, and each level value in the level value sequence corresponds to one value distribution probability; obtaining updated value distribution probabilities of the level values based on the value distribution probabilities of the run-length values and the value distribution probabilities of the level values and according to a preset mapping rule; and performing encoding, to be specific, entropy encoding, based on the level value sequence and the updated distribution probabilities of the level values to obtain and output encoded image data.

It can be learned that, after the one-dimensional sequence of the quantized coefficients of the image is obtained, run-length encoding is performed on the one-dimensional sequence to obtain a string of digit pairs (that is, a plurality of groups of run-length values N and level values a): $\{(N_1, a_1), (N_2, a_2), (N_3, a_3), (N_4, a_4), \ldots, (N_i, a_i), \ldots \}$. In a conventional technology, N and a are considered as being generated from a same signal source based on a specific probability, that is, information about their relative positions is actually artificially removed. As a result, a source entropy is increased, causing unnecessary redundancy. In this application, N and a are considered as a specific integration of data generated from two signal sources. Therefore, distribution probabilities of N and a are separately counted to obtain the run-length value sequence and the level value sequence in the solution. Elements in the run-length value sequence are possible values of run-length values obtained by performing run-length encoding on the one-dimensional sequence, and an element in the run-length value sequence corresponds to one distribution probability. Descriptions of the level value sequence are similar. Then the run-length values are mapped to the level values according to a plurality of mapping rules in the solution of this application, to obtain the updated distribution probabilities of the level values. Entropy encoding is performed by using the level values and the distribution probabilities of the level values. Specifically, Huffman coding is performed. The level values are used to represent the run-length values to continue completing the image encoding. The technical solution of this application is highly implementable and simple. Separate processing on N and a contributes to a performance gain in compression and shortens an average length of encoded codewords, without increasing complexity of Huffman encoding and decoding.

According to a second aspect, this application provides an image encoding apparatus. The apparatus includes: an obtaining unit, configured to: obtain a one-dimensional sequence of quantized coefficients of an image, where the one-dimensional sequence is obtained by scanning a two-dimensional matrix of the quantized coefficients; and obtain a run-length value sequence and a level value sequence based on the one-dimensional sequence of the coefficients, where the run-length value sequence is $N=\{N_0, N_1, N_2, \ldots, N_{m-1}\}$, the level value sequence is $a=\{a_0, a_1,$ $a_2, \ldots, a_{n-1}\}$, both m and n are positive integers, each run-length value in the run-length value sequence corresponds to one value distribution probability, and each level value in the level value sequence corresponds to one value distribution probability; a processing unit, configured to obtain updated value distribution probabilities of the level values based on the value distribution probabilities of the run-length values and the value distribution probabilities of the level values and according to a preset mapping rule; and an encoding and output unit, configured to: perform entropy encoding based on the level value sequence and the updated distribution probabilities of the level values to obtain and output encoded image data.

According to a third aspect, this application further provides an image encoding apparatus. The apparatus includes: at least one input interface, configured to: obtain a one-dimensional sequence of quantized coefficients of an image, where the one-dimensional sequence is obtained by scanning a two-dimensional matrix of the quantized coefficients; and obtain a run-length value sequence and a level value sequence based on the one-dimensional sequence of the coefficients, where the run-length value sequence is $N=\{N_0, N_1, N_2, \ldots, N_{m-1}\}$, the level value sequence is $a=\{a_0, a_1, a_2, \ldots, a_{n-1}\}$, both m and n are positive integers, each run-length value in the run-length value sequence corresponds to one value distribution probability, and each level value in the level value sequence corresponds to one value distribution probability; a logic circuit, configured to: obtain updated value distribution probabilities of the level values based on the value distribution probabilities of the run-length values and the value distribution probabilities of the level values and according to a preset mapping rule, and perform entropy encoding based on the level value sequence and the updated distribution probabilities of the level values; and at least one output interface, configured to output encoded image data.

In some implementations of the first aspect, the second aspect, or the third aspect, a run-length value $N_u$ with a largest distribution probability among the m values in the run-length value sequence is mapped to a level value $a_x$ with a largest distribution probability among the n values in the level value sequence, to obtain an updated distribution probability of the level value $a_x$, where u and x are non-negative integers. To be specific, the run-length value $N_u$ is mapped to the level value $a_x$ to obtain the updated value distribution probability of the level value $a_x$, where the updated value distribution probability of the level value $a_x$ is generated based on the value distribution probability of the run-length value $N_u$ and the value distribution probability of the level value $a_x$. The run-length value sequence includes m values, and the run-length value $N_u$ is a run-length value with the largest distribution probability among the m values of the run-length value sequence. The level value sequence includes n values, and the level value $a_x$ is a level value with the largest distribution probability among the n values of the level value sequence; and m and n are positive integers.

In some implementations of the first aspect, the second aspect, or the third aspect, the run-length values are respectively mapped to the level values based on a position of the level value $a_x$ in the level value sequence, to obtain the updated value distribution probabilities of the level values.

It is found, by analyzing a status of distribution probabilities of run-length values and level values that are obtained by performing run-length encoding on a general image, that value distribution probabilities of the run-length values roughly present a regularity of a descending order, and value distribution probabilities of the level values roughly present a regularity of symmetric distribution on the left and right sides, with a point having a largest distribution probability as a center. A mapping scheme may be simplified by using the characteristics of the distribution probabilities of the run-length values and the level values of the general image. To be specific, the run-length values are mapped to the level values based on the position of the level value $a_x$ in the level value sequence, to obtain the updated value distribution probabilities of the level values.

In some implementations of the first aspect, the second aspect, or the third aspect, the preset mapping rule includes: mapping, in descending order of the value distribution probabilities of the run-length values, the run-length values to the level values sorted in descending order of the value distribution probabilities of the level values, to obtain the updated value distribution probabilities of the level values.

In some implementations of the first aspect, the second aspect, or the third aspect, a run-length value sequence $N_0', N_1', N_2', \ldots, N_{m-1}'$ sorted based on the distribution probabilities is obtained in descending order of the distribution probabilities corresponding to the run-length values; a level value sequence $a_0', a_1', a_2', \ldots, a_{n-1}'$ sorted based on the distribution probabilities is obtained in descending order of the distribution probabilities corresponding to the level values. m and n are positive integers. When m is less than n, run-length values $N_m', N_{m+1}', N_{m+2}', \ldots, N_{n-1}'$ are created, distribution probabilities corresponding to the run-length values $N_m', N_{m+1}', N_{m+2}', \ldots, N_{n-1}'$ are all 0s, a run-length value $N_i'$ is mapped to a level value $a_i'$, $i \in [0, n-1]$, and i is an integer; or when m is greater than n, level values $a_n', a_{n+1}', a_{n+2}', \ldots, a_m'$ are created, distribution probabilities corresponding to the level values $a_n', a_{n+1}', a_{n+2}', \ldots, a_m'$ are all 0s, a run-length value $N_i'$ is mapped to a level value $a_i'$, $i \in [0, m-1]$, and i is an integer; or when m is equal to n, a run-length value $N_i'$ is mapped to a level value $a_i'$, $i \in [0, n-1]$, and i is an integer. The updated distribution probabilities of the level values are obtained. Alternatively, a run-length value sequence $N_0', N_1', N_2', \ldots, N_{m-1}'$ sorted based on the distribution probabilities is obtained in descending order of the distribution probabilities corresponding to the run-length values; a level value sequence $a_0', a_1', a_2', \ldots, a_{n-1}'$ sorted based on the distribution probabilities is obtained in descending order of the distribution probabilities corresponding to the level values. m and n are positive integers. When m is less than n, a run-length value $N_i'$ is mapped to a level value $a_i'$, $i \in [0, m-1]$, is an integer, a distribution probability of a level value to which no run-length value is mapped remains unchanged; or when m is greater than n, a run-length value is mapped to a level value $a_i'$, $i \in [0, n-1]$, i is an integer, a distribution probability of a run-length value that is not mapped remains unchanged, and the run-length value that is not mapped is added to the level value sequence; or when m is equal to n, a run-length value $N_i'$ is mapped to a level value $a_i'$, $i \in [0, n-1]$, and i is an integer. The updated distribution probabilities of the level values are obtained.

It can be understood that, according to the mapping rule, a run-length value with a largest distribution probability is combined with a level value with a largest distribution probability, a run-length value with a second largest distribution probability is combined with a level value with a second largest distribution probability, and so on, until a combination with a run-length value with a smallest distribution probability or a level value with a smallest distribution probability is completed. Compared with other mapping schemes in this application, this scheme can achieve higher compression efficiency and fully utilize probability distributions of two signal sources: N and a.

In some implementations of the first aspect, the second aspect, or the third aspect, the preset mapping rule includes: mapping the run-length values to the level values in ascending or descending order of the run-length values in the run-length value sequence, to obtain the updated value distribution probabilities of the level values.

In some implementations of the first aspect, the second aspect, or the third aspect, when m is less than or equal to (n−x), the run-length value $N_i$ is mapped to a level value $a_{x+i}$, where the level value $a_x$ is a level value with a largest distribution probability among the n values of the level values, $i \in [0, m−1]$, is an integer, x is a non-negative integer, and a distribution probability of a level value to which no run-length value is mapped remains unchanged; or when m is greater than (n−x), the run-length value $N_i$ is mapped to the level value $a_{x+i}$, where the level value $a_x$ is a level value with a largest distribution probability among the n values of the level values, $i \in [0, n−x]$, i is an integer, x is a non-negative integer, a distribution probability of a run-length value that is not mapped remains unchanged, the run-length value that is not mapped is added to the level value sequence, and a distribution probability of a level value to which no run-length value is mapped remains unchanged; and the updated distribution probabilities of the level values are obtained. Alternatively, when m is less than or equal to (x+1), the run-length value $N_i$ is mapped to a level value $a_{x−i}$, where the level value $a_x$ is a level value with a largest distribution probability among the n values of the level values, $i \in [0, m−1]$, i is an integer, x is a non-negative integer, and a distribution probability of a level value to which no run-length value is mapped remains unchanged; or when m is greater than (x+1), the run-length value $N_i$ is mapped to the level value $a_{x−i}$, where the level value $a_x$ is a level value with a largest distribution probability among the n values of the level values, $i \in [0, x+1]$, i is an integer, x is a non-negative integer, a distribution probability of a run-length value that is not mapped remains unchanged, the run-length value that is not mapped is added to the level value sequence, and a distribution probability of a level value to which no run-length value is mapped remains unchanged; and the updated distribution probabilities of the level values are obtained.

Compared with the optimal mapping rule, this mapping scheme simplifies the original mapping rule, so that compression efficiency is improved while only a very small amount of data needs to be additionally transmitted. The small amount of data is used to notify a decoder side of the mapping rule.

In some implementations of the first aspect, the second aspect, or the third aspect, the preset mapping rule includes: mapping odd-numbered run-length values in the run-length value sequence to a first group of level values a1, and mapping even-numbered run-length values other than a run-length value numbered 0 in the run-length value sequence to a second group of level values a2, where level values in the first group of level values a1 are different from those in the second group of level values a2.

In some implementations of the first aspect, the second aspect, or the third aspect, the run-length value $N_0$ is mapped to the level value $a_x$, where the level value $a_x$ is a level value with a largest distribution probability among the n values of the level values. The odd-numbered run-length values in the run-length value sequence are respectively mapped to the first group of level values a1, where sequence numbers of the first group of level values a1 in the level value sequence are less than x; and the even-numbered run-length values other than the run-length value numbered 0 in the run-length value sequence are respectively mapped to the second group of level values a2, where sequence numbers of the second group of level values a2 in the level value sequence are greater than x, and x is a non-negative integer. Alternatively, the even-numbered run-length values other than the run-length value numbered 0 in the run-length value sequence are respectively mapped to the first group of level values a1, where sequence numbers of the first group of level values a1 in the level value sequence are less than x; and the odd-numbered run-length values in the run-length value sequence are respectively mapped to the second group of level values a2, where sequence numbers of the second group of level values a2 in the level value sequence are greater than x, and x is a non-negative integer.

Compared with the optimal mapping rule, this mapping scheme simplifies the original mapping rule, but uses characteristics of a probability distribution of the level values, so that compression efficiency is not significantly compromised compared with the optimal scheme. In this way, compression efficiency is improved while only a very small amount of data needs to be additionally transmitted. The small amount of data is used to notify a decoder side of the mapping rule.

In some implementations of the first aspect, the second aspect, or the third aspect, the entropy encoding includes Huffman (Huffman) encoding.

According to a fourth aspect, this application provides an image decoding method. The method includes: obtaining encoded image data;

performing first decoding on the encoded image data to obtain first-decoded image data, where the first-decoded image data includes first-decoded run-length values and level values, and the first-decoded run-length values are determined based on the level values;

performing demapping on the first-decoded image data according to a preset mapping rule, to obtain run-length values and level values of the image data; and performing second decoding based on the run-length values and the level values of the image data, to obtain second-decoded image data.

According to a fifth aspect, this application provides an image decoding apparatus. The apparatus includes an obtaining unit, a first decoding unit, a demapping unit, and a second decoding unit. The obtaining unit is configured to obtain encoded image data. The first decoding unit is configured to perform first decoding on the encoded image data to obtain first-decoded image data, where the first-decoded image data includes first-decoded run-length values and level values, and the first-decoded run-length values are determined based on the level values. The demapping unit is configured to perform demapping on the first-decoded image data according to a preset mapping rule, to obtain run-length values and level values of the image data. The second decoding unit is configured to perform second decoding based on the run-length values and the level values of the image data, to obtain second-decoded image data.

According to a sixth aspect, this application provides an image decoding apparatus. The apparatus includes at least one input interface (input(s)), a logic circuit, and at least one output interface (output(s)). The at least one input interface is configured to obtain encoded image data. The logic circuit is configured to: perform first decoding on the encoded image data to obtain first-decoded image data, where the first-decoded image data includes first-decoded run-length values and level values, and the first-decoded run-length values are determined based on the level values; perform demapping on the first-decoded image data according to a preset mapping rule, to obtain run-length values and level values of the image data; and perform second decoding based on the run-length values and the level values of the image data, to obtain second-decoded image data. The at least one output interface is configured to output second-decoded image data.

In some implementations of the fourth aspect, the fifth aspect, or the sixth aspect, a mapping relationship between the run-length values and the level values is determined based on a position of a level value $a_x$ in a level value sequence, where the level value $a_x$ is a level value with a largest distribution probability among n values of the level values.

In some implementations of the fourth aspect, the fifth aspect, or the sixth aspect, the preset mapping rule includes: mapping, in descending order of value distribution probabilities of the run-length values, the run-length values to the level values sorted in descending order of value distribution probabilities of the level values, to obtain updated value distribution probabilities of the level values.

In some implementations of the fourth aspect, the fifth aspect, or the sixth aspect, the preset mapping rule includes: mapping the run-length values to the level values in ascending or descending order of the run-length values in a run-length value sequence, to obtain updated value distribution probabilities of the level values.

In some implementations of the fourth aspect, the fifth aspect, or the sixth aspect, the preset mapping rule includes: mapping odd-numbered run-length values in a run-length value sequence to a first group of level values a1, and mapping even-numbered run-length values other than a run-length value numbered 0 in the run-length value sequence to a second group of level values a2, where level values in the first group of level values a1 are different from those in the second group of level values a2.

According to a seventh aspect, this application provides an image processing apparatus. The apparatus includes a processor and a memory. The memory is electrically coupled to the processor. The memory is configured to store computer-readable instructions or a computer program. The processor is configured to read the computer-readable instructions or the computer program, to implement the encoding method according to any one of the foregoing aspects or the implementations of the foregoing aspects and/or the decoding method according to any one of the foregoing aspects or the implementations of the foregoing aspects.

According to an eighth aspect, this application provides a computer-readable storage medium including computer program instructions. When the computer program instructions are run on a computer, the encoding method according to any one of the foregoing aspects or the implementations of the foregoing aspects and/or the decoding method according to any one of the foregoing aspects or the implementations of the foregoing aspects are/is implemented.

According to a ninth aspect, this application provides a computer program product.

When the computer program product is run on a computer, the computer is enabled to perform the encoding method according to any one of the foregoing aspects or the implementations of the foregoing aspects and/or the decoding method according to any one of the foregoing aspects or the implementations of the foregoing aspects.

According to a tenth aspect, this application provides a computer program. When the computer program product is run on a computer, the encoding method according to any one of the foregoing aspects or the implementations of the foregoing aspects and/or the decoding method according to any one of the foregoing aspects or the implementations of the foregoing aspects are/is implemented.

In the embodiments of this application, an image encoder first obtains a one-dimensional sequence of quantized coefficients of an image, where the one-dimensional sequence is obtained by scanning a two-dimensional matrix of the quantized coefficients; obtains a run-length value sequence and a level value sequence based on the one-dimensional sequence of the coefficients, where each run-length value in the run-length value sequence corresponds to one distribution probability, and each level value in the level value sequence corresponds to one distribution probability; obtains updated distribution probabilities of the level values based on the distribution probabilities of the run-length values and the distribution probabilities of the level values and according to a preset mapping rule; and finally performs encoding based on the level value sequence and the updated distribution probabilities of the level values to obtain and output encoded image data. After obtaining the encoded image data, a decoder side performs demapping on first-decoded image data according to the obtained mapping rule, to obtain the run-length values and the level values; and then performs second decoding to obtain an image. Compared with that in a conventional decoding scheme, the decoder side only needs to additionally learn of the mapping rule. In this way, complexity of encoding and decoding is not increased. The technical solutions of this application are highly implementable with a simple procedure, and can effectively reduce an amount of data for representing an image, and improve image compression efficiency.

BRIEF DESCRIPTION OF DRAWINGS

The following describes accompanying drawings used in embodiments of this application.

DESCRIPTION OF EMBODIMENTS

Figure 1:
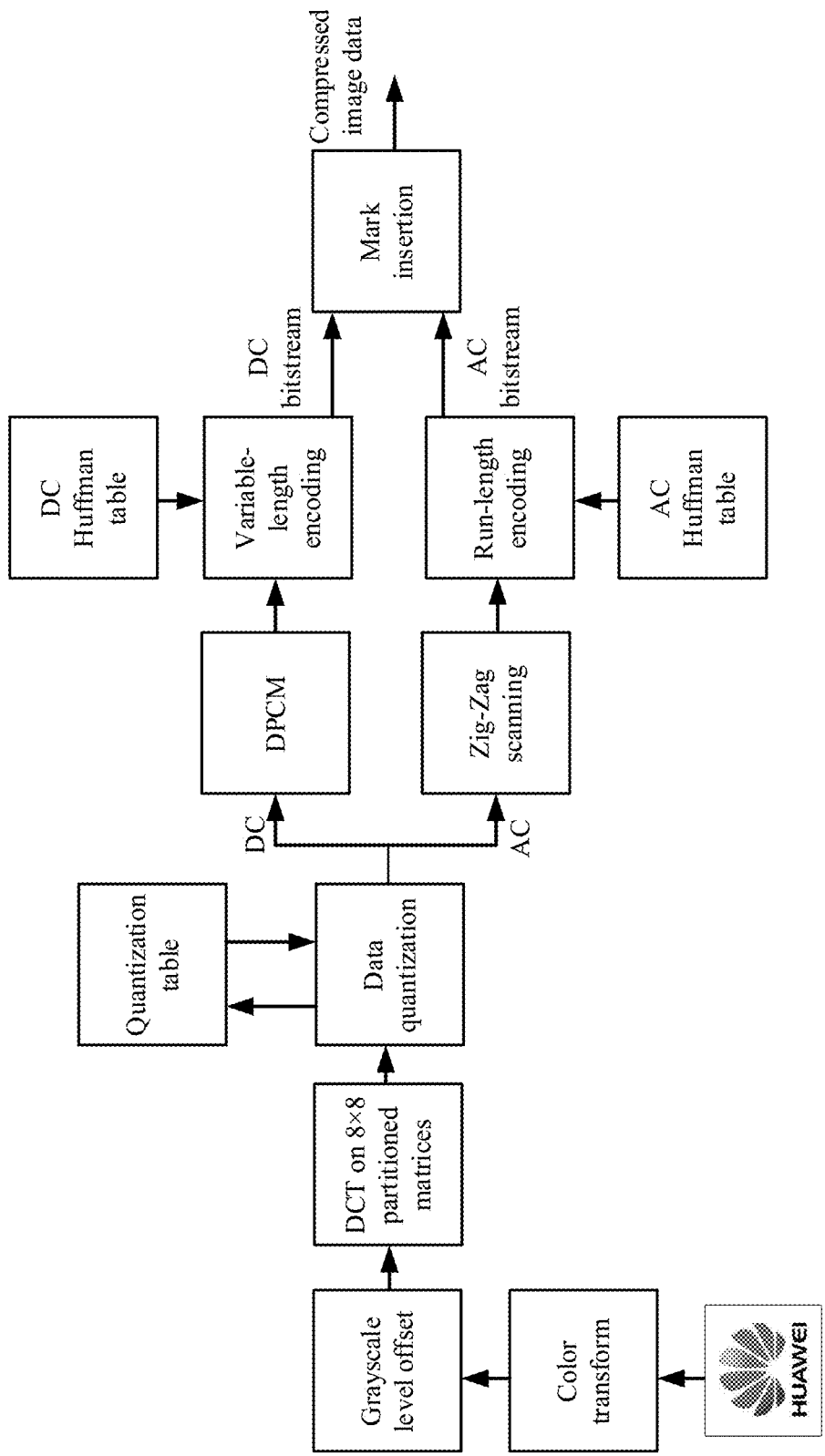
FIG. 1 is a flowchart of typical JPEG image compression.

The following describes the technical solutions in the embodiments of this application with reference to the accompanying drawings in the embodiments of this application. In descriptions of the embodiments of this application, "I" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In the descriptions of the embodiments of this application, terms "first" and "second" are merely intended for description, and shall not be understood as an indication or implication of relative importance or implicit indication of a quantity of indicated technical features. Therefore, a feature limited by "first", "second", or the like may explicitly or implicitly include one or more features. In the descriptions of the embodiments of this application, unless otherwise specified, "a plurality of" means two or more than two.

Terms such as "component", "module", and "system" used in this application are used to indicate computer-related entities, hardware, firmware, a combination of hardware and software, software, or software being executed. For example, a component may be, but is not limited to, a process that runs on a processor, a processor, an object, an executable file, an executable thread, a program, and/or a computer. As shown in figures, both a computing device and an application that runs on the computing device may be components. One or more components may reside in the process and/or executable thread, and a component may be located on one computer and/or distributed between two or more computers. In addition, these components may be executed from various computer-readable media that store various data structures. The components may perform communication by using a local and/or remote process and based on, for example, a signal having one or more data packets (for example, data from two components interacting with another component in a local system, a distributed system, and/or a network such as the internet interacting with another system by using the signal). It should be noted that numbers of steps in method embodiments of this application are merely intended to identify the steps in the methods, but do not limit a sequence of the numbered steps.

Before specific embodiments of this application are described, encoding and decoding technologies used in image and video data compression are described first.

Run-length encoding (run-length encoding, RLE), also referred to as run-length encoding or run-length encoding, is an encoding technology widely used in image and video data compression. The run-length encoding is essentially a lossless data compression technology independent of data properties, and implements compression by "replacing raw data that occurs continuously and repeatedly with variable-length codes".

Using Joint Photographic Experts Group (JPEG) image compression coding as an example, a JPEG standard image compression method is the most popular and effective method for still and continuous-tone images. This algorithm is applicable to most scenarios for compressing still and continuous-tone images, and can achieve a high compression ratio and ensure small visual distortion of a restored image.

FIG. 1 shows a typical JPEG image compression procedure. First, color transform (color transform) is performed on a raw image to obtain three grayscale matrices: Y, U, and V. Then a corresponding level offset (level offset) is performed on the matrices to adjust a grayscale range. Then grayscale matrices obtained through the level offset are divided into 8×8 smaller partitioned matrices (0s are used to fill empty positions), and discrete cosine transform (discrete cosine transform, DCT) is performed on the smaller partitioned matrices to obtain component information of corresponding discrete frequencies. After DCT is performed, a hidden regularity in data is discovered, and disordered data is converted into several pieces of data that change regularly. The 1st piece of data in a matrix obtained through DCT is constant linear data, and therefore is also referred to as a "direct-current component", which is DC for short. Next data is referred to as an "alternating-current component", which is AC for short. This term originates from a term used in signal analysis.

Then quantization (uniform scalar quantization) is performed on the frequency component information to obtain a direct-current component coefficient (DC coefficient) and an alternating-current component coefficient (AC coefficient). The JPEG algorithm provides two standard quantized coefficient matrices: one for processing luminance data, and the other for processing chromatic aberration data. For the alternating-current component coefficient, because an image signal is dominated by a low-frequency component, and human eyes are more sensitive to the low-frequency component, a quantization step for quantizing the AC part is usually larger. As a result, a plurality of 0s may occur in a signal of the AC part. In an actual compression process, the data may be further multiplied by a coefficient based on these coefficients as required, so that more or less data becomes 0. When commonly used image processing software generates a JPG file, compression quality is controlled by controlling the coefficient.

Figures 2, 3:
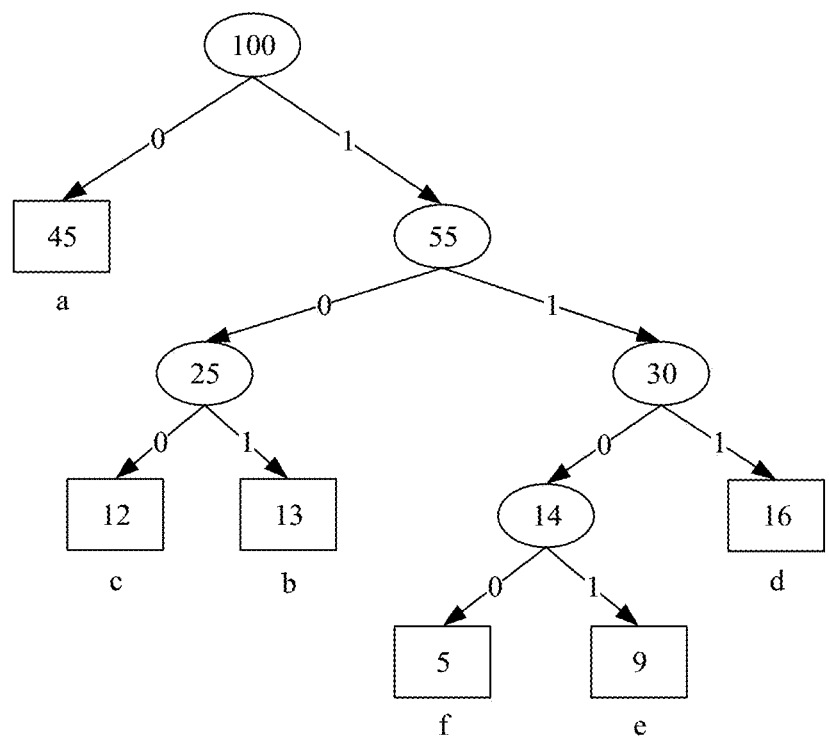
FIG. 2 shows a sequence of values for converting a two-dimensional coefficient matrix into a one-dimensional sequence through Zig-Zag scanning.
FIG. 3 is a schematic principle diagram of Huffman encoding.

Before a next step of image processing, matrix quantization further includes a last step: transforming a quantized two-dimensional matrix into a one-dimensional array (which is also referred to as a sequence) to facilitate subsequent Huffman compression. However, the sequential transformation needs to be performed according to a specific order of values. As shown in FIG. 2, an 8×8 matrix may be transformed into a sequence string through Zig-Zag scanning. An example in the figure is (15, 0, −2, −1, −1, −1, 0, . . . ). It can be learned that many consecutive 0s are very likely to occur at the end of the sequence string. To save space, run-length encoding is further performed on the sequence string to obtain a shorter sequence. Specifically, the run-length encoding herein is an operation performed on a digital sequence string that includes many consecutive 0s. Any non-0 digit a in the sequence string is encoded into two digits (N, a). Herein, N indicates a quantity of consecutive 0s before the digit a, N is referred to as a run-length value, and a is referred to as a level value. For example, a sequence (0, 0, 8, 0, 5, 5, 0, 0, 0, 6) is encoded into {(2, 8), (1, 5), (0, 5), (3, 6)}, and (9, 0, 0, 0, 0, 4, 0, 0, 0, 0, 0, 1) is encoded into {(0, 9), (4, 4), (5, 1)}. After run-length-encoded data is obtained, because probabilities of the digits are different, entropy encoding (entropy coding) needs to be further performed on the data to eliminate redundancy. Huffman encoding (Huffman coding) or arithmetic encoding (arithmetic coding) is usually used in a system. In the embodiments of this application, Huffman coding is used as an example, but use of other encoding methods such as polar encoding (polar coding) and low-density parity check encoding (LDPC coding) is not excluded.

For a conventional entropy encoding scheme such as Huffman encoding, run-length-encoded data is considered as being generated independently from a single signal source based on a specific distribution. Therefore, before Huffman encoding, a probability of occurrence of each digit needs to be counted, and a corresponding dictionary (a Huffman tree) is generated through Huffman coding based on the probability. A basic principle of the Huffman encoding is representing a digit with a larger probability of occurrence by using fewer binary bits, and representing a digit with a smaller probability of occurrence by using more binary bits. Refer to an example of Huffman coding shown in FIG. 3. A probability distribution of characters (a, b, c, d, e, f) is 45%, 13%, 12%, 16%, 9%, 5%. Starting from f and e, leaf nodes are first built from bottom to top and gradually upwards to complete an entire tree. One symbol of the characters, that is, a symbol with a smallest frequency, is taken out of the list first, and then one more symbol is taken out of the list. The two symbols serve as nodes of the Huffman tree, and the two nodes are used to generate a new node, that is, their parent node. Frequency, namely, a weight of the new node is a sum of frequency of the child nodes. The new node is added to the Huffman tree. The foregoing steps are repeated to take two symbols out of the list and construct a new parent node, . . . , until only one node remains in the queue. The node is a root node of the Huffman tree. Finally, a=0, b=101, c=100, d=111, e=1101, and f=1100. After the foregoing Huffman encoding is completed, a JPEG image compression process ends.

Figure 4:
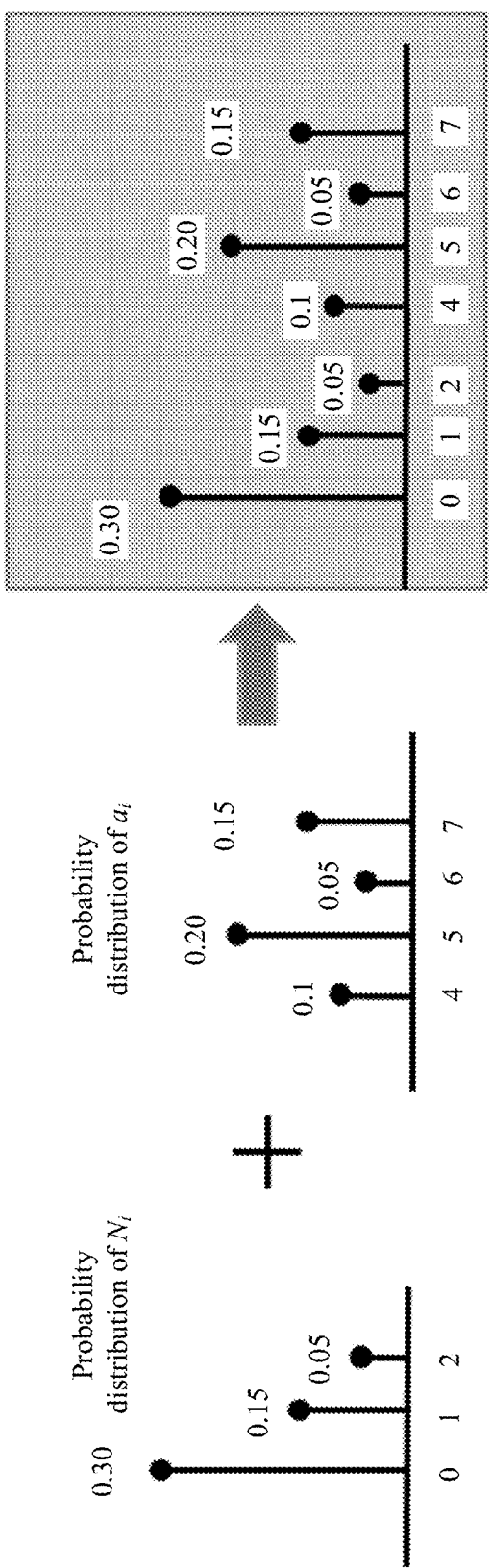
FIG. 4 shows an embodiment of a statistical probability distribution obtained through Huffman encoding.

According to the foregoing descriptions of the run-length encoding and the entropy encoding, a string of digit pairs is obtained through the run-length encoding: $\{(N_1, a_1), (N_2, a_2), (N_3, a_3), (N_4, a_4), \ldots, (N_i, a_i), \ldots\}$, where $N_i$ indicates a quantity of consecutive 0s that occur before the digit $a_i$. In the entropy encoding, the quantity $N_i$, obtained through the run-length encoding, of 0s that occur before the digit symbol $a_i$ is considered as being obtained by collecting statistics on and compressing signals that are generated from a same discrete signal source based on a fixed distribution. For example, N={0, 1, 2} (that is, a value of $N_i$ is 0, 1, or 2), and a={4, 5, 6, 7}. Occurrence frequency of the values is counted as {0.3, 0.15, 0.05, 0.1, 0.20, 0.05, 0.15}. A statistical probability distribution of the values that is obtained through Huffman encoding is shown in FIG. 4.

A dictionary obtained through Huffman coding is [00, 011, 1111, 110, 10, 1110, 010] used to represent {0, 1, 2, 4, 5, 6, 7} respectively. An average length achieved after compression is 2.6 bits. In this case, an entropy corresponding to a probability combination {0.3, 0.15, 0.05, 0.1, 0.20, 0.05, 0.15} is 2.5710. Performance of Huffman encoding is very close to optimal performance.

However, how encoding performance is further improved on this basis? It is found through observation that relative position information of the symbols N and a is not used in the foregoing process of counting the probability distribution based on the sequence string obtained through run-length encoding and then performing Huffman encoding. Specifically, N and a always occur in pairs, and N is always in front of a. N and a are considered as being generated from a same signal source based on a specific probability, that is, information about their relative positions is actually artificially removed. As a result, a source entropy is increased, causing unnecessary redundancy.

Brief analysis is provided herein. It is assumed that a probability distribution P of a part corresponding to the run-length value N satisfies $P=\{p_1, \ldots, p_i, \ldots\}$, and a probability distribution Q of a part corresponding to the level value a part satisfies $Q=\{q_1, \ldots, q_i, \ldots\}$ Because N and a occur in pairs and in a fixed order, a sequence actually obtained through run-length encoding may be considered as a fixed integration of data generated from two signal sources. The $1^{st}$ signal source generates all run-length values N by using the probability distribution P, while the $2^{nd}$ signal source generates all level values a by using the probability distribution Q. An entropy $H_P$ corresponding to the $1^{st}$ signal source satisfies $$H_P = \Sigma_i p_i \cdot \log_2 \frac{1}{p_i},$$

and an entropy $H_Q$ corresponding to the $2^{nd}$ signal source satisfies $$H_Q = \Sigma_i q_i \cdot \log_2 \frac{1}{q_i}.$$

Because $N_i$ and $a_i$ occur in pairs and occurrence probabilities of the two parts of data are ½ and ½, an entropy of data actually obtained through run-length encoding is $$\frac{H_P + H_Q}{2}.$$

Still using the distribution in FIG. 4 as an example, values of N are {0, 1, 2}, with a probability distribution of $$\frac{\{0.3, 0.15, 0.05\}}{0.5}$$

(the division by 0.5 is intended for normalization); and values of a are {4, 5, 6, 7}, with a probability distribution of $$\frac{\{0.1, 0.20, 0.05, 0.15\}}{0.5}.$$

It can be calculated that $H_P=1.2955$, $H_q=1.8464$, and $$\frac{H_P + H_Q}{2} = 1.5710.$$

The entropy obtained in this way is 1 bit less than that calculated directly based on the probability distribution of {0.3, 0.15, 0.05, 0.1, 0.20, 0.05, 0.15}. The following proves that an average length obtained in the foregoing method of compressing N and a separately can be up to 1 bit less than that in a conventional technology.

A variable $X_\theta$ is defined, where values of $\theta$ are {0, 1}. When $\theta=0$, $X_\theta=N$; or when $\theta=1$, $X_\theta=a$. In addition, regardless of whether $\theta$ is 0 or 1, a probability is ½. Actually, $\theta$ corresponds to position information. When $\theta$ is given, a conditional entropy of $X_\theta$ with respect to $\theta$ is as follows:

$$H(X_\theta \mid \theta) = P(\theta = 0)H(X_\theta \mid \theta = 0) + P(\theta = 1)H(X_\theta \mid \theta = 1) \quad (1)$$

$$= \frac{1}{2}H(X_\theta \mid \theta = 0) + \frac{1}{2}H(X_\theta \mid \theta = 1) \quad (2)$$

$$= \frac{1}{2}H(N) + \frac{1}{2}H(a) = \frac{H_P + H_Q}{2} \quad (3)$$

However, in a conventional compression method, compression is performed when $X_\theta$ indicates a sequence number of a signal source. Therefore, a source entropy corresponding to conventional run-length encoding is $H(X_\theta)$. Then $H(X_\theta)=H(X_\theta|\theta)+I(X_\theta;\theta)$ is obtained according to a mutual information formula. Because $\theta$ indicates a binary signal, $I(X_\theta; \theta) \le 1$. However, when $\theta$ is fully determined by $X_\theta$, $I(X_\theta; \theta)=H(\theta)=1$. In this case, it indicates that there is no intersection between possible digits corresponding to N and a. As described in the foregoing example, N may be {0, 1, 2}, and a may be {4, 5, 6, 7}, without any intersection. If any digit of {0, 1, 2, 4, 5, 6, 7} is known, whether it comes from N or a is explicitly known. In this case, an average length after compression is reduced by one bit and reaches an optimal value. Generally, support sets have an intersection, and distributions of N and a overlap to some extent. Therefore, the average length is reduced by less than one bit.

It can be learned from the foregoing analysis that separate processing on N and a contributes to a performance gain in compression. Huffman encoding may be separately performed on data corresponding to N and data corresponding to a. In the same example, a distribution of N is {0.6, 0.3, 0.1}, a mapping obtained through Huffman encoding is {0→0, 1→10, 2→11}, and an average length is 1.4; a distribution of a is {0.2, 0.4, 0.1, 0.3}, a mapping obtained through Huffman encoding is {4→000, 5→1, 6→001, 7→01}, and an average length is 1.9. In this case, an average length that can be achieved is 1.65. However, herein, an entropy codec needs to be informed of both the foregoing two mappings, and Huffman decoding needs to be performed twice. As a result, the system becomes more complex, and a large delay is caused.

In this application, an effective combination method is used to effectively combine two data sets and then perform Huffman coding on a combined distribution. This improves compression efficiency without increasing complexity of Huffman coding.

Figure 5:
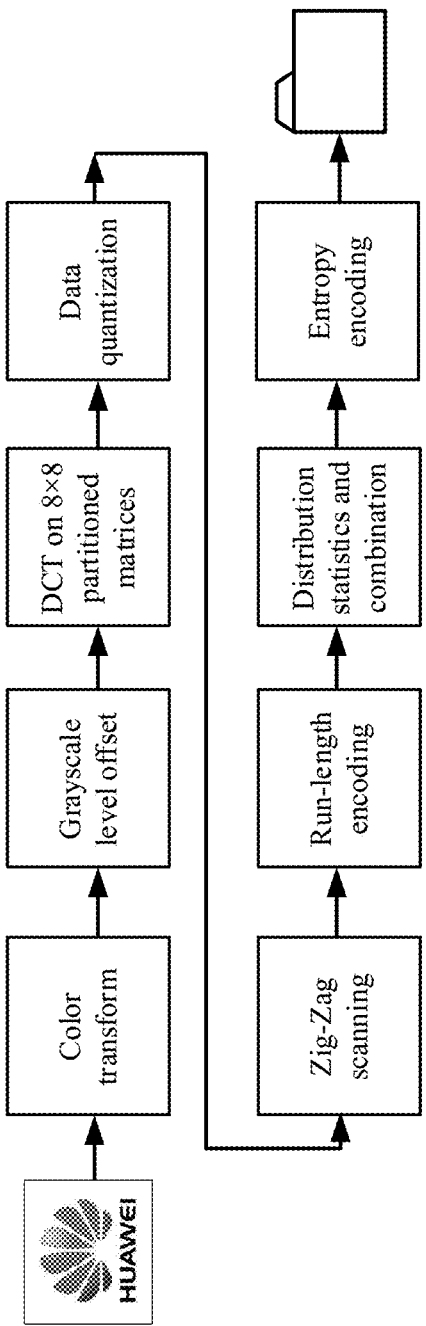
FIG. 5 is a framework diagram of an image encoding procedure according to an embodiment of this application.
Figure 6:
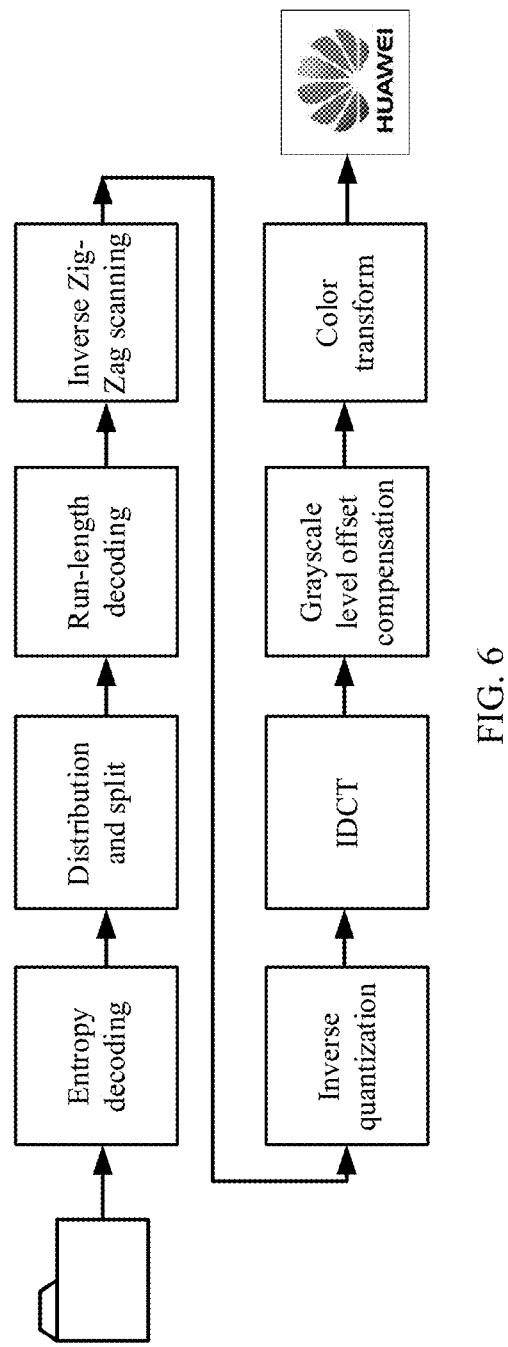
FIG. 6 is a framework diagram of an image decoding procedure according to an embodiment of this application.

FIG. 5 is a framework diagram of an image encoding procedure according to an embodiment of this application. A system including functions in the procedure can support various image encoding methods provided in the embodiments of this application. As shown in FIG. 5, image data successively undergoes color transform, a grayscale level offset, 8×8 DCT, data quantization, Zig-Zag scanning, and run-length encoding (RLE) to obtain a plurality of groups of run-length values and level values (N, a). Then data sets of N and a and their distributions are counted separately. Then the two distributions are combined based on a mapping relationship and the distributions of N and a. Finally, Huffman encoding (entropy encoding) is performed on a combined new distribution to complete data compression. An image restoration process is an inverse process of this procedure, and a procedure of the image restoration process is shown in FIG. 6. FIG. 6 is a framework diagram of an image decoding procedure according to an embodiment of this application. A system including functions in the procedure can support various image decoding methods provided in the embodiments of this application. Compressed image data first undergoes Huffman decoding (entropy decoding) to obtain a plurality of groups of combined run-length values and level values. The mapped run-length values are represented by the level values according to a mapping rule. The combined run-length values are split according to the mapping rule to obtain run-length values and level values (N, a). Then run-length decoding (RLD), inverse Zig-Zag scanning, inverse quantization, IDCT, grayscale level offset compression, and color transform are further performed to finally obtain a decoded image. It can be understood that a system including an encoding function and a system including a decoding function may be integrated into one system, or the two systems may exist independently. The following specifically describes different implementation solutions.

Figure 7:
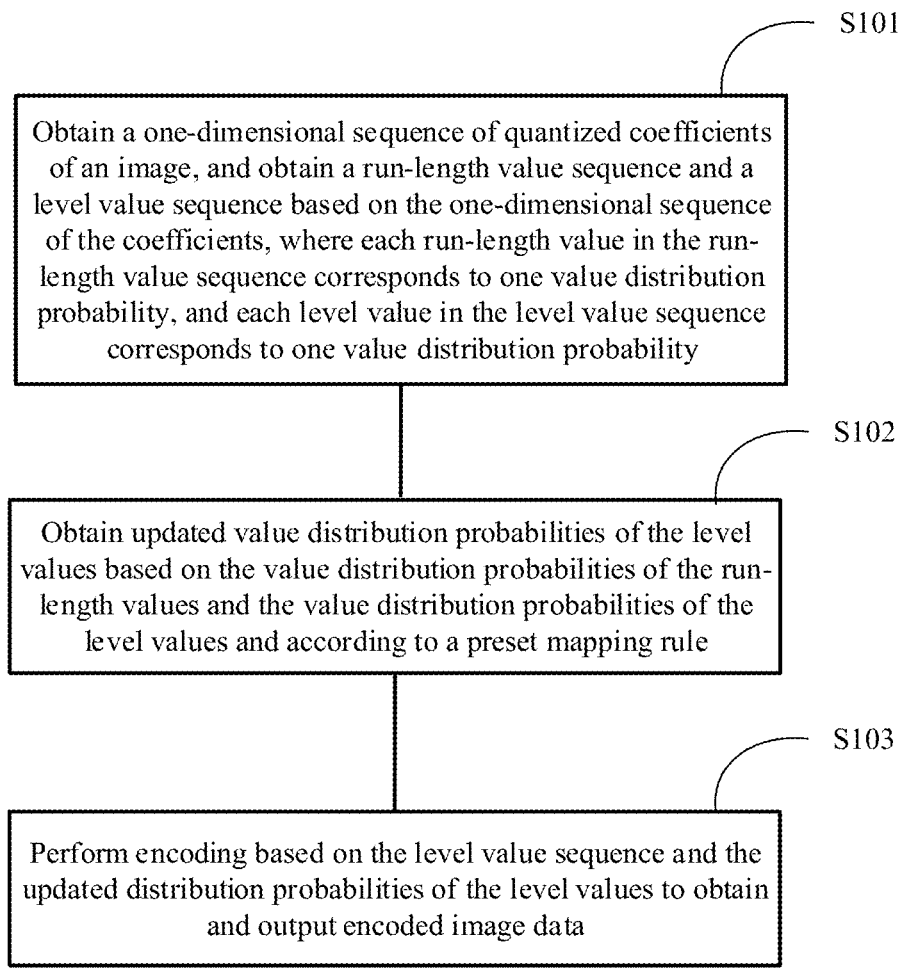
FIG. 7 is a flowchart of an image encoding method according to an embodiment of this application.

FIG. 7 is a flowchart of an image encoding method according to an embodiment of this application. The method includes the following steps.

S101. Obtain a one-dimensional sequence of quantized coefficients of an image, where the one-dimensional sequence is obtained by scanning a two-dimensional matrix of the quantized coefficients; and obtain a run-length value sequence and a level value sequence based on the one-dimensional sequence of the coefficients, where the run-length value sequence is $N=\{N_0, N_1, N_2, \ldots, N_{m-1}\}$, the level value sequence is $a=\{a_0, a_1, a_2, \ldots, a_{n-1}\}$, both m and n are positive integers, each run-length value in the run-length value sequence corresponds to one value distribution probability, and each level value in the level value sequence corresponds to one value distribution probability.

S102. Obtain updated value distribution probabilities of the level values based on the value distribution probabilities of the run-length values and the value distribution probabilities of the level values and according to a preset mapping rule.

S103. Perform encoding based on the level value sequence and the updated distribution probabilities of the level values to obtain and output encoded image data.

As described in the foregoing general method for processing image data, in step S101, direct-current component coefficients and alternating-current component coefficients obtained by performing quantization processing on image data are obtained first, and a matrix constituted by the direct-current component coefficients and the alternating-current component coefficients is scanned through Zig-Zag (Zig-Zag) scanning to generate a sequence string of quantized coefficients of the image. A specific example is used for description, as shown in the following quantization process of the two-dimensional matrix:

$$\begin{bmatrix} -415.38 & -30.19 & -61.20 & 27.24 & 56.12 & -20.10 & -2.39 & 0.46 \\ 4.47 & -21.86 & -60.76 & 10.25 & 13.15 & -7.09 & -8.54 & 4.88 \\ -46.83 & -7.37 & 77.13 & -24.56 & -28.91 & 9.93 & 5.42 & -5.65 \\ -48.53 & 12.07 & 34.10 & -14.76 & -10.24 & 6.30 & 1.83 & 1.95 \\ 12.12 & -6.55 & -13.20 & -3.95 & -1.87 & 1.75 & -2.79 & 3.14 \\ -7.73 & 2.91 & 2.38 & -5.94 & -2.38 & 0.94 & 4.30 & 1.85 \\ -1.03 & 0.18 & 0.42 & -2.42 & -0.88 & -3.02 & 4.12 & -0.66 \\ -0.17 & 0.14 & -1.07 & -4.19 & -1.17 & -0.10 & 0.50 & 1.68 \end{bmatrix} \xrightarrow{Quantization} \begin{bmatrix} -26 & -3 & -6 & 2 & 2 & -1 & 0 & 0 \\ 0 & -2 & -4 & 1 & 1 & 0 & 0 & 0 \\ -3 & 1 & 5 & -1 & -1 & 0 & 0 & 0 \\ -3 & 1 & 2 & -1 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

It can be learned that a large amount of data is quantized into 0s, and a small amount of data is quantized into integers. The quantized two-dimensional matrix needs to be transformed into a one-dimensional array (sequence), to facilitate subsequent Huffman (Huffman) encoding (Huffman compression). Values are obtained in a Zig-Zag (Zig-Zag) order to place coefficients 0 together as much as possible. It is found through observation that a large quantity of 0s are centralized in the lower right corner of the matrix. Therefore, the coefficients of the two-dimensional matrix are read in an order from the upper left corner to the lower right corner: {−26, −3, 0, −3, −2, −6, 2, −4, 1, −3, 0, 1, 5, 1, 2, −1, 1, −1, 2, 0, 0, 0, 0, 0, −1, −1, 0, 0, 0, 0, . . . , 0, 0}.

In an actual compression process, an occurrence probability of 0 in the coefficients is very high. First, 0s in the coefficients are processed. Run-length encoding (run-length encoding, RLE) achieves a very high compression ratio for characters that repeatedly occur consecutively. Non-0 data and a quantity of 0s before the data are considered as a processing unit. The processing unit includes two parts: a run-length value (run-length value) N and a level value (level value) a, where the run-length value N indicates a quantity of consecutive 0s before the level value a of the unit, and the level value a indicates a value of a non-0 coefficient of the processing unit. It can be understood that the level value a in the processing unit may be alternatively a coefficient 0. For example, a processing unit (15, 0) indicates 16 0s.

A simple example is further used for description. Assuming that the one-dimensional sequence of the quantized coefficients of the image is {35, 7, 0, 0, 0, −6, −2, 0, 0, −9, 0, 0, 0, 0, 0, 0, 0, 0, 0, 0, 0, 0, 0, 0, 0, 0, 0, 0, 8, 0, 0, 0, . . . , 0}, the one-dimensional sequence may be processed into (0, 35), (0, 7), (3, −6), (0, −2), (2, −9), (15, 0), (2, 8), EOB, or may be directly expressed as a sequence {0, 35, 0, 7, 3, −6, 0, −2, 2, −9, 15, 0, 2, 8, EOB} or another form that can reflect the run-length value and the level value. A rule may be set: If a quantity of 0s in a unit exceeds 16, every 16 0s need to be grouped into one group. If the last unit includes all 0s, the special character "EOB" is used to indicate the unit. EOB indicates that "next data is all 0s".

In step S101, for convenience of implementation of this technical solution, distribution probabilities of the run-length values and the level values are counted separately, to count occurrence probabilities of different run-length values in all the run-length values and occurrence probabilities of different level values in all the level values. The run-length value sequence and the level value sequence are constructed. The run-length value sequence is N={$N_0$, $N_1$, $N_2$, . . . , $N_{m-1}$}, and the level value sequence is a={$a_0$, $a_1$, $a_2$, . . . , $a_{n-1}$}, where both m and n are positive integers. Elements in the run-length value sequence are different run-length values, and elements in the level value sequence are different level values. Generally, a value range of the run-length value is [0, 64], and is less than a value range of the level value. In another embodiment, the run-length value sequence and the level value sequence may not be constructed, but a statistical result may be directly used. Online calculation or offline calculation may be performed for statistics. In addition, each run-length value in the run-length value sequence corresponds to one value distribution probability, and each level value in the level value sequence also corresponds to one value distribution probability.

In step S102, the updated value distribution probabilities of the level values are obtained based on the value distribution probabilities of the run-length values and the value distribution probabilities of the level values and according to the preset mapping rule. Each element in the run-length value sequence is mapped to a corresponding element in the level value sequence. In a specific embodiment, the mapping rule is that only the elements in the level value sequence are retained after the mapping. The value distribution probabilities of the run-length values and the value distribution probabilities of the level values are added up to obtain the updated value distribution probabilities of the level values. In a possible case of this specific embodiment, the run-length values cannot be all mapped to the level values for a specific reason. In this case, a run-length value that is not mapped is retained, and undergoes Huffman (Huffman) encoding together with the level values. In another possible case, all the run-length values are mapped, but there is a redundant level value. In this case, the redundant level value is retained, and all the level values undergo Huffman (Huffman) encoding. In this application document, although this technical solution of this application is described around mapping the run-length values to the level values, it is easily figured out that the level values may be alternatively mapped to the run-length values. A mapping rule may be obtained through appropriate adjustment or by reversing a correspondence between the run-length values and the level values with reference to the mapping rule and method for mapping the run-length values to the level values in this solution of this application.

In a specific embodiment, a run-length value $N_u$ is mapped to a level value $a_x$ to obtain an updated value distribution probability of the level value $a_x$. The updated value distribution probability of the level value $a_x$ is generated based on a value distribution probability of the run-length value $N_u$ and a value distribution probability of the level value $a_x$ u and x are non-negative integers. The run-length value sequence includes m values. In this case, the run-length value $N_u$ is a run-length value with a largest distribution probability among the m values in the run-length value sequence. The level value sequence includes n values. In this case, the level value $a_x$ is a level value with a largest distribution probability among the n values in the level value sequence. m and n are positive integers. A specific example is used for description. A run-length value 0 is a run-length value with a largest distribution probability in the run-length value sequence, and has a distribution probability 0.5. A level value 1 is a level value with a largest distribution probability in the level value sequence, and has a distribution probability 0.3. After mapping is performed, only the level value 1 is retained for participating in subsequent Huffman (Huffman) encoding, and an updated value distribution probability of the level value is 0.8.

In another specific embodiment, the run-length values are respectively mapped to the level values based on a position of the level value $a_x$ in the level value sequence, to obtain the updated value distribution probabilities of the level values. In this specific embodiment, the level value $a_x$ with the largest distribution probability may serve as a reference for a mapping position. Features of the Huffman (Huffman) encoding can be maximized as much as possible only if the level value with the largest distribution probability (and/or the run-length value with the largest distribution probability) is fully utilized, so that a codeword obtained through Huffman encoding is shortened.

Finally, in step S103, entropy encoding is performed based on the level value sequence and the updated distribution probabilities of the level values to obtain and output the encoded image data. It should be understood that this technical solution of this disclosure focuses on improvement of the run-length encoding or the entropy encoding, and this technical solution of this disclosure may be integrated into a conventional encoding or decoding technology for image compression. Therefore, it can be understood that this disclosure does not describe features of a conventional technology excessively. Mentioned features of a conventional technology are intended to help improve integrity of this technical solution of this disclosure.

Figure 8:
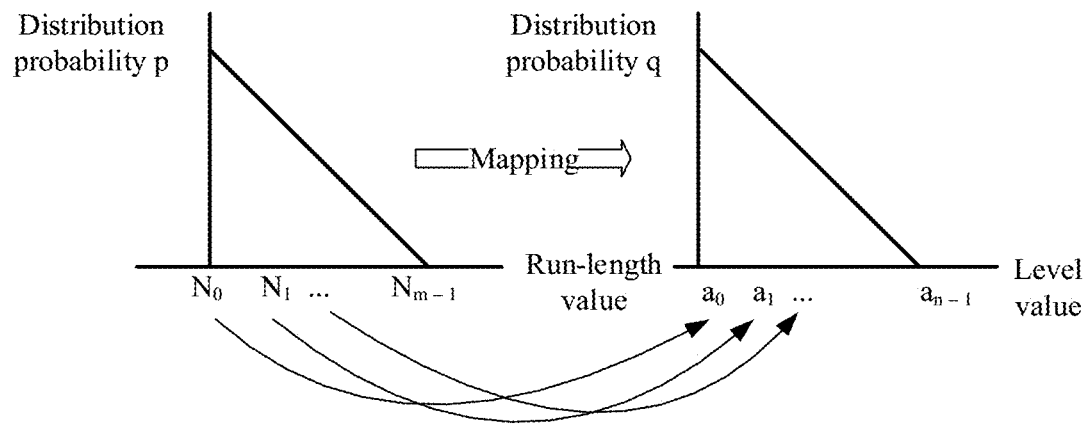
FIG. 8 is a principle diagram of an image encoding method according to an embodiment of this application.

FIG. 8 is a principle diagram of an image encoding method according to an embodiment of this application. First, a run-length value sequence and a level value sequence are obtained. An obtaining method is described in step S101 of the foregoing embodiment. The run-length value sequence is $N=\{N_0, N_1, N_2, \ldots, N_{m-1}\}$, and the level value sequence is $a=\{a_0, a_1, a_2, \ldots, a_{n-1}\}$, where both m and n are positive integers. Each run-length value in the run-length value sequence corresponds to one value distribution probability, and value distribution probabilities corresponding to the run-length values are $p_0, p_1, p_2, \ldots, p_{m-1}$. Each level value in the level value sequence corresponds to one value distribution probability, and value distribution probabilities corresponding to the level values are $q_0, q_1, q_2, \ldots, q_{n-1}$ in descending order.

Updated value distribution probabilities of the level values are obtained based on the value distribution probabilities of the run-length values and the value distribution probabilities of the level values and according to a preset mapping rule. A specific mapping rule is: mapping, in descending order of the value distribution probabilities of the run-length values, the run-length values to the level values sorted in descending order of the value distribution probabilities of the level values, to obtain the updated value distribution probabilities of the level values. To be specific, a run-length value with a largest value distribution probability is combined with (mapped to) a level value with a largest value distribution probability, a run-length value with a second largest value distribution probability is combined with a level value with a second largest value distribution probability, and so on, until a combination with a run-length value with a smallest value distribution probability or a level value with a smallest value distribution probability is completed. It should be noted that the run-length value with the smallest value distribution probability is not necessarily combined with (mapped to) the level value with the smallest value distribution probability. Because a quantity of elements in the run-length value sequence is not necessarily equal to that of elements in the level value sequence, combination stops if combination of all elements in either sequence is completed, and an element that has not completed mapping is retained for participating in Huffman (Huffman) encoding. Optionally, a sequence, of the run-length value sequence and the level value sequence, that has a smaller quantity of elements may be alternatively supplemented with an element, so that quantities of elements in the two sequences are equal, and then combination (mapping) is performed.

Finally, entropy encoding is performed based on the level value sequence and the updated distribution probabilities of the level values to obtain and output encoded image data. The entropy encoding may be Huffman (Huffman) encoding, arithmetic encoding, polar encoding, LDPC encoding, or the like. This is not limited in this application. Specific types of entropy encoding are not described in detail in this embodiment of this application again.

According to a principle of the Huffman (Huffman) encoding, if a bit length corresponding to a run-length value $N_i$ in a Huffman (Huffman) dictionary is expressed as $l_i$, and a bit length corresponding to a level value $a_i$ in the Huffman (Huffman) dictionary is expressed as $k_i$, the following relationships are met: $l_0 \leq l_1 \leq l_2 \leq \ldots \leq l_{m-1}$, and $q_0 \leq q_1 \leq q_2 \leq \ldots \leq q_{n-1}$. After the foregoing mapping method is used, it can still be ensured that an item with a larger probability is expressed by using a smaller length, because a combined probability still meets the following sorting:

$$\frac{p_0 + q_0}{2} \geq \frac{p_1 + q_1}{2} \geq \frac{p_2 + q_2}{2} \geq \cdots.$$

In a specific embodiment, a run-length value sequence $N_0', N_1', N_2', \ldots, N_{m-1}'$ sorted based on the distribution probabilities is obtained in descending order of the value distribution probabilities corresponding to the run-length values, and a level value sequence $a_0', a_1', a_2', \ldots, a_{n-1}'$ sorted based on the distribution probabilities is obtained in descending order of the value distribution probabilities corresponding to the level values, where m and n are positive integers.

When m is less than n, a quantity of elements in the run-length value sequence is less than that of elements in the level value sequence, that is, value types of the run-length values are fewer than those of the level values. A method for performing supplementation first and then mapping is used. Run-length values $N_m', N_{m+1}', N_{m+2}', \ldots, N_{n-1}'$ are created. Value distribution probabilities corresponding to the run-length values $N_m', N_{m+1}', N_{m+2}', \ldots, N_{n-1}'$ are all 0s. A run-length value $N_i$ is mapped to a level value $a_i$, where $i \in [0, n-1]$, and i is an integer.

When m is greater than n, a quantity of elements in the run-length value sequence is greater than that of elements in the level value sequence, that is, value types of the run-length values are more than those of the level values. A method for performing supplementation first and then mapping is used. Level values $a_n', a_{n+1}', a_{n+2}', \ldots, a_m'$ are created. Value distribution probabilities corresponding to the level values $a_n', a_{n+1}', a_{n+2}', \ldots, a_m'$ are all 0s. A run-length value $N_i$ is mapped to a level value $a_i$, where $i \in [0, n-1]$, and i is an integer.

When m is equal to n, a quantity of elements in the run-length value sequence is equal to that of elements in the level value sequence, that is, value types of the run-length values are as many as those of the level values. A run-length value $N_i$ is mapped to a level value $a_i$, where $i \in [0, n-1]$, and i is an integer. The updated value distribution probabilities of the level values are obtained.

Alternatively, a run-length value sequence $N_0'$, $N_1'$, $N_2'$, ..., $N_{m-1}'$ sorted based on the distribution probabilities is obtained in descending order of the value distribution probabilities corresponding to the run-length values, and a level value sequence $a_0'$, $a_1'$, $a_2'$, ..., $a_{n-1}'$ sorted based on the distribution probabilities is obtained in descending order of the value distribution probabilities corresponding to the level values, where m and n are positive integers.

When m is less than n, a quantity of elements in the run-length value sequence is less than that of elements in the level value sequence, that is, value types of the run-length values are fewer than those of the level values. A method for performing direct mapping is used. A run-length value is mapped to a level value $a_i'$, where $i \in [0, n-1]$, and i is an integer. A value distribution probability of a level value to which no run-length value is mapped remains unchanged.

When m is greater than n, a quantity of elements in the run-length value sequence is greater than that of elements in the level value sequence, that is, value types of the run-length values are more than those of the level values. A method for performing direct mapping is used. A run-length value $N_i'$ is mapped to a level value $a_i'$, where $i \in [0, n-1]$, and i is an integer. A value distribution probability of a run-length value that is not mapped remains unchanged.

When m is equal to n, a quantity of elements in the run-length value sequence is equal to that of elements in the level value sequence, that is, value types of the run-length values are as many as those of the level values. A run-length value is mapped to a level value $a_i'$, where $i \in [0, n-1]$, and i is an integer. The updated value distribution probabilities of the level values are obtained.

After the mapping is completed, entropy encoding is performed based on the level value sequence and the updated distribution probabilities of the level values to obtain and output encoded image data.

It should be noted that demapping of $a_0' \to N_0'$, $a_1' \to N_1'$, $a_2' \to N_2'$, ..., and $a_i' \to N_i'$, ... needs to be performed during decoding, to correctly restore image data. Under this mapping rule, both $a_i'$ and $N_i'$ are reference signs obtained through sorting, and therefore do not necessarily indicate sorting in ascending or descending order of natural numbers. All specific mapping relationships need to be stored and notified to a decoder, or an encoder and the decoder agree on a mapping rule. A specific decoding method is described in a subsequent embodiment. Although this mapping rule is a good solution, additional data redundancy is caused. In the following mapping scheme, this mapping scheme is simplified with reference to some characteristics of statistical distributions of $a_i$ and $N_i$.

Figure 9:
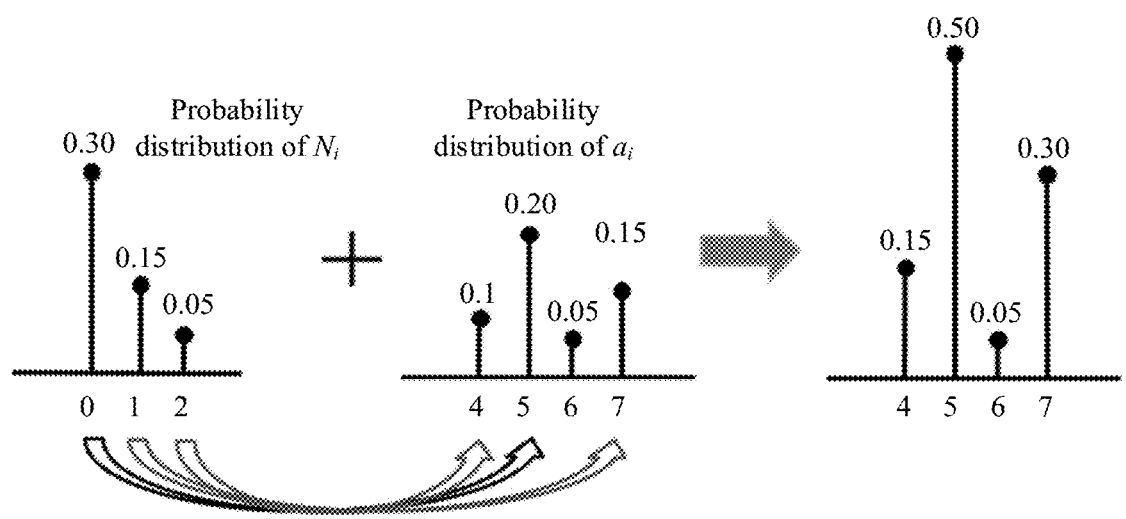
FIG. 9 is a schematic diagram of a specific mapping rule based on the image encoding method.

FIG. 9 is a schematic diagram of a specific mapping rule based on the image encoding method. First, statistics are collected on a distribution status of run-length values and a distribution status of level values, to obtain a run-length value sequence and a level value sequence. The obtained run-length value sequence is N={0,1,2}, and the obtained level value sequence is a={4,5,6,7}. Distribution probabilities (a normalized distribution) corresponding to all elements in the run-length value sequence are 0.6, 0.3, and 0.1. Distribution probabilities (a normalized distribution) corresponding to all elements in the level value sequence are 0.2, 0.4, 0.1, and 0.3. The elements in the two sequences are re-sorted in descending order of the distribution probabilities to obtain a run-length value sequence 0, 1, 2 sorted based on the distribution probabilities, and obtain a level value sequence 5, 7, 4, 6 sorted based on the distribution probabilities. A mapping relationship determined according to the foregoing method is as follows: 0→5, 1→7, and 2→4, where → indicates being mapped to. Updated value distribution probabilities (a normalized distribution) of the level values {5, 7, 4, 6} are easily calculated: 0.5, 0.3, 0.15, and 0.05 (the probabilities of the raw run-length values and the raw level values in FIG. 4 have been processed for subsequent normalized distributions). In addition, it can be further learned through calculation that a source entropy obtained after the combination becomes 1.6477 bits. An average length in Huffman compression is 1.700. Compared with that in a conventional technology in which the method of this application is not implemented, the source entropy is reduced from 2.5710 bits to 1.6477 bits. The source entropy is greatly reduced, and the average length in Huffman compression is also reduced. It can be found through observation that a decrease in the source entropy in this solution of this application has not reached 1 bit. The decrease is strictly less than 1 bit because there is a specific difference between the two distributions.

Compared with a conventional method in which (N, a) obtained through run-length encoding is considered as a sequence generated from a same signal source based on a same specific distribution, in this embodiment of this application, distributions of the run-length values and the level values are first counted separately, and then mapping and combination are performed according to the method. This achieves an effect similar to that of compressing the two parts of data independently, but shares a same Huffman coding tree. It should be noted that, because sorting is performed based on the probabilities in this process, symbol sets of the run-length values N and the basic values a are not necessarily sorted in ascending order of values. Therefore, the decoder needs to obtain the mapping relationship, and additional space is required for storing the mapping relationship.

Figure 10:
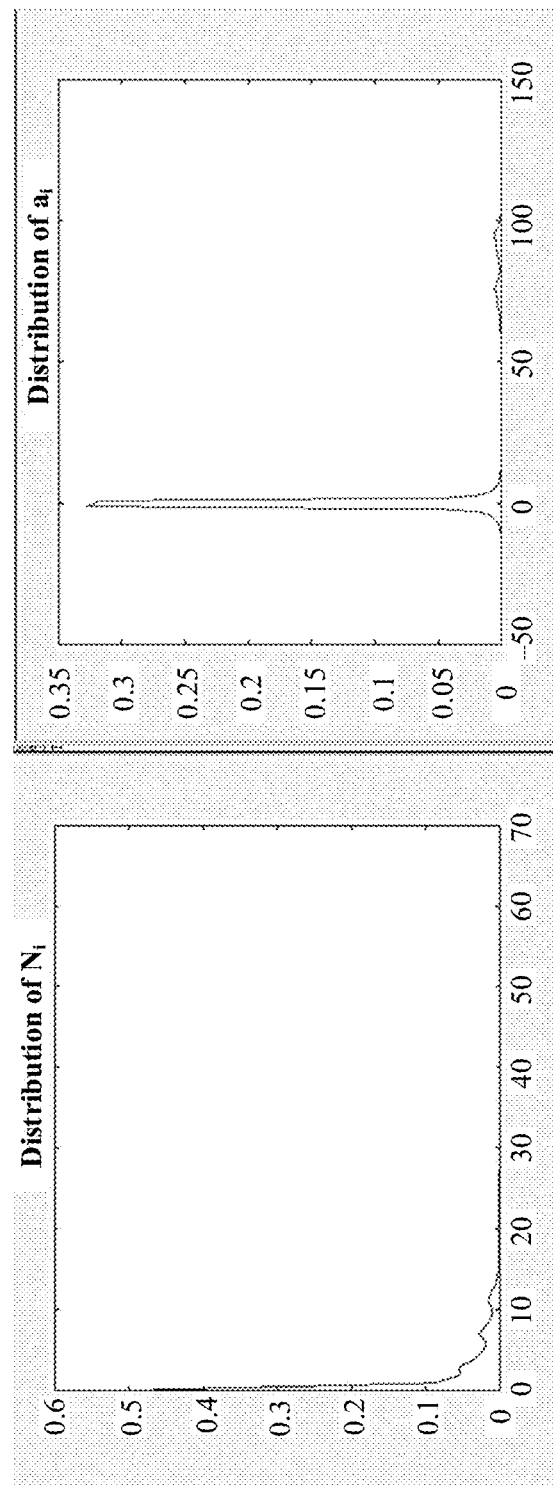
FIG. 10 is a statistical diagram of distribution probabilities of run-length and level values obtained by performing run-length encoding on a real image.

A status of distribution probabilities of run-length values obtained by performing run-length encoding on real image data and a status of distribution probabilities of level values are shown in FIG. 10. It can be found that value distribution probabilities of the run-length values roughly present a regularity of a descending order, and there are occasionally jump points, without affecting an overall trend. For the level values, a point with a largest distribution probability exists in the middle of the values. It can be considered that value distribution probabilities of the level values roughly present a status of symmetric distribution on the left and right sides, with the point having the largest distribution probability as a center. The mapping scheme is simplified by using characteristics of distribution probabilities of run-length values and level values of a general image.

Figure 11:
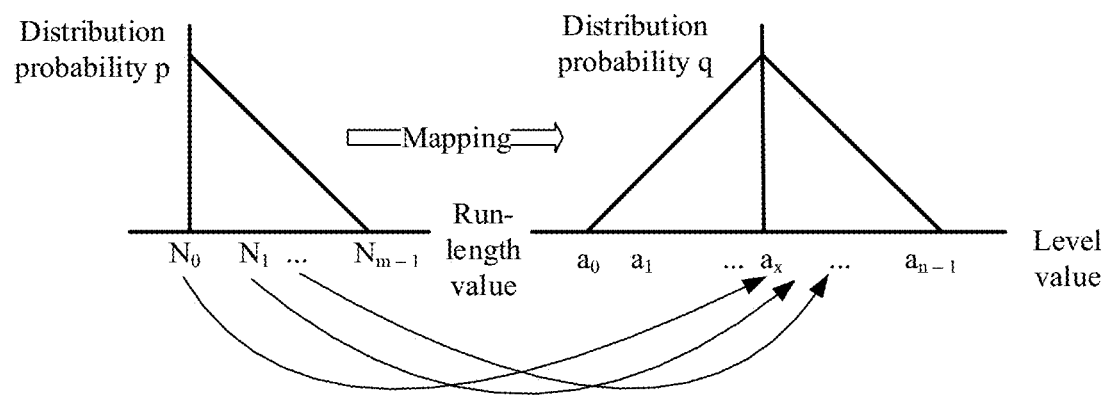
FIG. 11 is a principle diagram of another image encoding method according to an embodiment of this application.

FIG. 11 is a principle diagram of another image encoding method according to an embodiment of this application. Similar to those in the foregoing method, a run-length value sequence and a level value sequence are obtained first. An obtaining method is described in step S101 of the foregoing embodiment. The run-length value sequence is N={$N_0$, $N_1$, $N_2$, ..., $N_{m-1}$}, and the level value sequence is a={$a_0$, $a_1$, $a_2$, ..., $a_{n-1}$}, where both m and n are positive integers. Each run-length value in the run-length value sequence corresponds to one value distribution probability, and each level value in the level value sequence corresponds to one value distribution probability.

Updated value distribution probabilities of level values are obtained based on value distribution probabilities of run-length values and value distribution probabilities of the level values and according to a preset mapping rule. The mapping rule is: mapping the run-length values to the level values in ascending or descending order of the run-length values in the run-length value sequence, to obtain the updated value distribution probabilities of the level values. Specifically, all the run-length values $N_i$ are mapped to the right side of a level value $a_x$ with a largest distribution probability by using the foregoing characteristics obtained through analysis on the distribution probabilities of the run-length values and the level values of the image. The run-length values and the level values no longer need to be re-sorted based on the distribution probabilities. Further, distribution probabilities of the run-length values even do not need to be counted. In addition, Huffman encoding is performed on a new combined distribution, and a mapping dictionary in Huffman encoding informs a decoder side that a character with a smallest bit length corresponds to $a_x$, that is, the run-length value $N_0$ is found (if there are a plurality of smallest bit lengths, the decoder side only needs to receive a very small amount of redundant information to identify a correspondence of $N_0$). After a value of $a_x$ is known, mapping to the raw run-length values can be performed according to $a_x \to N_0$, $a_{x+1} \to N_1$, $a_{x+2} \to N_2$, and so on.

In a specific embodiment, when m is less than or equal to (n−x), a quantity of elements in the run-length value sequence is less than or equal to a total quantity of an element with a largest distribution probability in the level value sequence and all elements on the left side of the element, that is, value types of the run-length values are fewer than or equal to total types of a value of a level value with a largest distribution probability and all values on the right side of the value. All the run-length values can be mapped. The run-length value $N_i$ is mapped to the level value $a_{x+i}$, where the level value $a_x$ is a level value with a largest distribution probability among the n values of the level values, i∈[0, n−1], is an integer, x is a non-negative integer, and a distribution probability of a level value to which no run-length value is mapped remains unchanged.

After the mapping is completed, entropy encoding is performed based on the level value sequence and the updated distribution probabilities of the level values to obtain and output encoded image data.

When m is greater than (n−x), a quantity of elements in the run-length value sequence is greater than a total quantity of an element with a largest probability in the level value sequence and all elements on the right side of the element with the largest probability, that is, value types of the run-length values are more than total types of a value of a level value with a largest distribution probability and all values on the right side of the value. Only some of the run-length values can be mapped. The run-length value $N_i$ is mapped to the level value $a_{x+i}$, where the level value $a_x$ is a level value with a largest value distribution probability among the n values of the level values, i∈[0, n−1], is an integer, x is a non-negative integer, a distribution probability of a run-length value that is not mapped remains unchanged, and a distribution probability of a level value to which no run-length value is mapped remains unchanged.

After the mapping is completed, entropy encoding is performed based on the level value sequence, the run-length value that is not mapped, and the updated distribution probabilities of the level values to obtain and output encoded image data.

Figure 12:
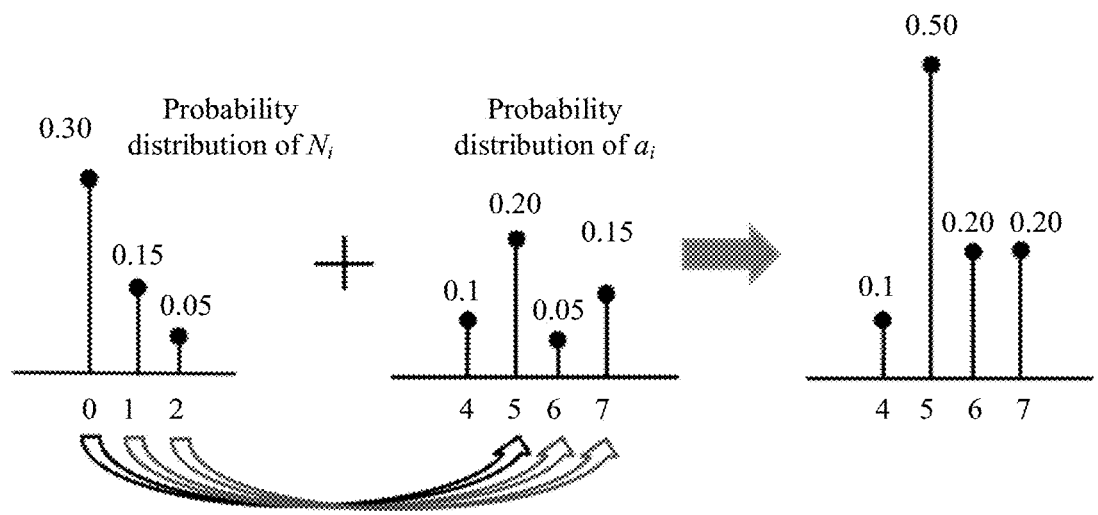
FIG. 12 is a schematic diagram of a specific mapping rule based on the image encoding method.

FIG. 12 is a schematic diagram of a specific mapping rule based on the image encoding method. Mapping is performed according to the foregoing method of mapping to the right side of a middle point, to obtain a run-length value sequence and a level value sequence. The obtained run-length value sequence is N={0,1,2}, and the obtained level value sequence is a=Distributions of the run-length values and the level values do not need to be sorted based on probabilities. Only a level value item $a_x$=5 with a largest distribution probability needs to be found. It can be understood that distribution probabilities of the level value sequence may need to be counted to find the level value with the largest distribution probability.

0 is mapped to 5, 1 is mapped to 6, and 2 is mapped to 7. An entire process is shown in FIG. 6. A level value sequence obtained after the mapping is {4, 5, 6, 7}. Updated value distribution probabilities (a normalized distribution) of the level values {4, 5, 6, 7} are easily calculated: 0.1, 0.5, 0.20, and 0.20 (the probabilities of the raw run-length values and the raw level values in the figure have been processed for subsequent normalized distributions). It can be learned through calculation that an entropy corresponding to the new distribution is 1.7610 bits. Compared with that in the preceding scheme, the source entropy is increased, because combinations of items other than the item with the largest probability is not necessarily optimal. An average length obtained after Huffman coding is 1.8000, which is also increased, but is still shorter than that in a conventional scheme.

It can be learned that compared with that in the preceding mapping scheme, a compression ratio is compromised in the scheme of mapping to the right side of a middle point, but an advantage lies in that it is not necessary to store an entire mapping regularity. When a decoder side performs mapping back (demapping) to raw data, in the foregoing example, the decoder only needs to know that the level value 5 in a position of a run-length value is to be mapped back to 0.5 is an item corresponding to a smallest Huffman length in a new distribution, and 0 is a minimum possible value of the run-length values. Generally, the decoder does not need to specially obtain or store this information. A maximum value of the run-length values may need to be obtained or stored. In this way, during decoding, it is known that 5 is to be mapped back to 0, 6 is to be mapped back to 1, and 7 is to be mapped back to 2.

First, statistics are collected on a distribution status of run-length values and a distribution status of level values, to obtain a run-length value sequence and a level value sequence. The obtained run-length value sequence is N={0, 1,2}, and the obtained level value sequence is a={5,7,4,6}. Distribution probabilities (a normalized distribution) corresponding to all elements in the run-length value sequence are 0.6, 0.3, and 0.1. Distribution probabilities (a normalized distribution) corresponding to all elements in the level value sequence are 0.2, 0.4, 0.1, and 0.3. The elements in the two sequences are re-sorted in descending order of the distribution probabilities to obtain a run-length value sequence 0, 1, 2 sorted based on the distribution probabilities, and obtain a level value sequence 5, 7, 4, 6 sorted based on the distribution probabilities. A mapping relationship determined according to the foregoing method is as follows: 0→5, 1→7, and 2→4, where → indicates being mapped to. Updated value distribution probabilities of the level values {5, 7, 4, 6} are easily calculated: 0.5, 0.3, 0.15, and 0.05. In addition, it can be further learned through calculation that a source entropy obtained after the combination becomes 1.6477 bits. An average length in Huffman compression is 1.700. Compared with that in a conventional technology in which the method of this application is not implemented, the source entropy is greatly reduced, and the average length in Huffman compression is reduced.

Figure 13:
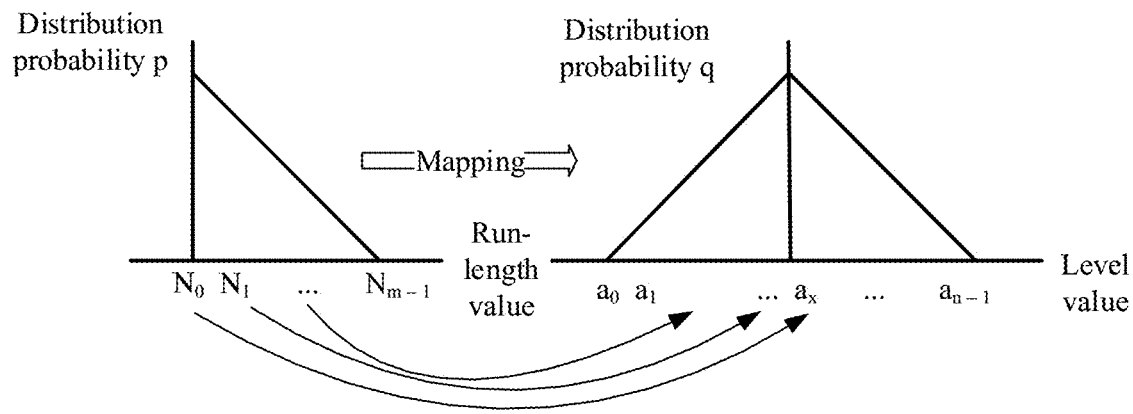
FIG. 13 is a schematic diagram of a magnetic induction waveguide coil 1004 (a second coil) according to an embodiment of this application.

FIG. 13 is a principle diagram of another image encoding method according to an embodiment of this application. Preparations are the same as those of the method related to FIG. 7, and details are not described again. A specific embodiment is used to directly describe a difference between mapping rules.

In a specific embodiment, when m is less than or equal to (x+1), a quantity of elements in the run-length value sequence is less than or equal to a total quantity of an element with a largest distribution probability in the level value sequence and all elements on the left side of the element, that is, value types of the run-length values are fewer than or equal to total types of a value of a level value with a largest distribution probability and all values on the right side of the value. All the run-length values can be mapped. The run-length value $N_i$ is mapped to the level value $a_{x-i}$, where the level value $a_x$ is a level value with a largest distribution probability among the n values of the level values, $i \in [0, n-1]$, is an integer, x is a non-negative integer, and a distribution probability of a level value to which no run-length value is mapped remains unchanged.

After the mapping is completed, entropy encoding is performed based on the level value sequence and the updated distribution probabilities of the level values to obtain and output encoded image data.

When m is greater than (x+1), the run-length value $N_i$ is mapped to the level value $a_{x-i}$, where the level value $a_x$ is a level value with a largest distribution probability among the n values of the level values, $i \in [0, n-1]$, i is an integer, x is a non-negative integer, a distribution probability of a run-length value that is not mapped remains unchanged, and a distribution probability of a level value to which no run-length value is mapped remains unchanged.

After the mapping is completed, entropy encoding is performed based on the level value sequence, the run-length value that is not mapped, and the updated distribution probabilities of the level values to obtain and output encoded image data.

Figure 14:
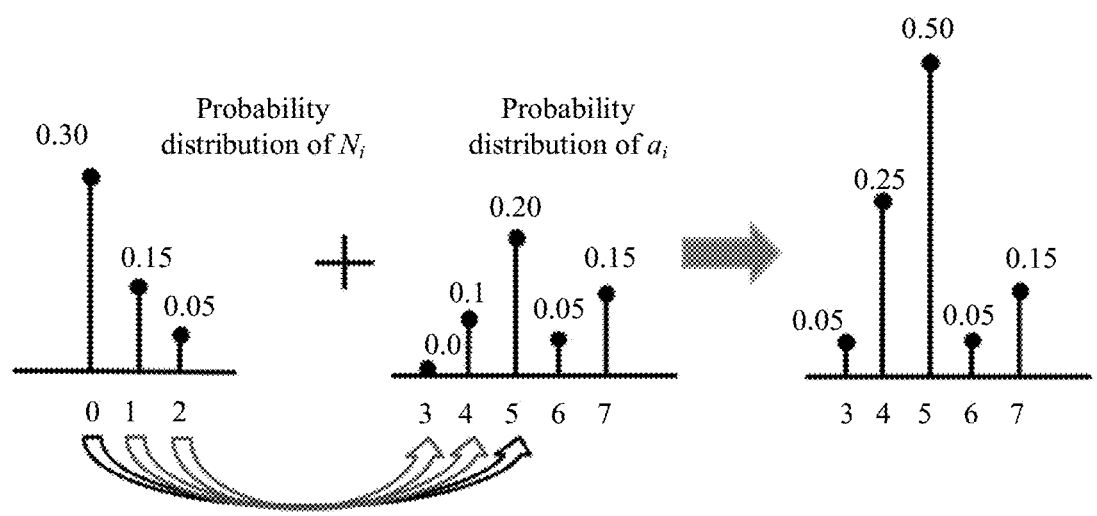
FIG. 14 is a schematic diagram of another specific mapping rule based on the image encoding method.

FIG. 14 is a schematic diagram of another specific mapping rule based on the image encoding method. Similarly, a scheme of mapping to the left side of a middle point is very similar to the scheme of mapping to the right side of a middle point in the foregoing embodiment. A run-length value sequence and a level value sequence are obtained based on the foregoing descriptions of the method of mapping to the left side of a middle point. The obtained run-length value sequence is N={0,1,2}, and the obtained level value sequence is a={4,5,6,7}. Distributions of the run-length values and the level values do not need to be sorted based on probabilities. Only a level value item $a_x=5$ with a largest distribution probability needs to be found.

In this example, there is only one element (a level value 4) on the left side of $a_x$. Therefore, an element 3 is added, and a distribution probability corresponding to the level value 3 is 0, so that all run-length values can be mapped. An entire process is shown in FIG. 12. A level value sequence obtained after the mapping is {3, 4, 5, 6, 7}. Updated value distribution probabilities (a normalized distribution) of the level values {3, 4, 5, 6, 7} are easily calculated: 0.05, 0.25, 0.50, 0.05, and 0.15 (the probabilities of the raw run-length values and the raw level values in the figure have been processed for subsequent normalized distributions). It can be learned through calculation that a source entropy in this case is 1.8427 bits, and an average length obtained after Huffman encoding is 1.850. Compared with that in the method of mapping to the right side of a middle point, a loss is slightly larger.

Figure 15:
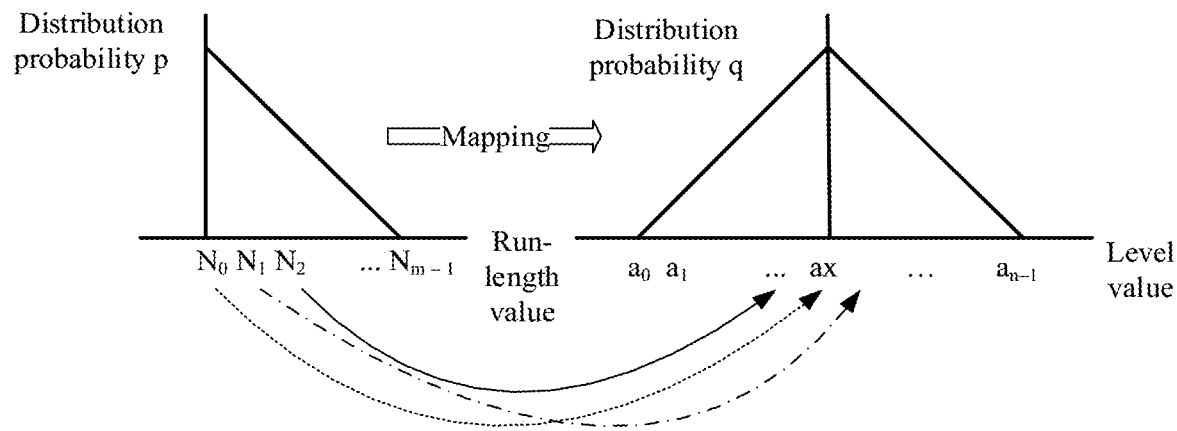
FIG. 15 is a principle diagram of an image encoding method according to an embodiment of this application.

FIG. 15 is a principle diagram of an image encoding method according to an embodiment of this application. Similar to those in the foregoing method, a run-length value sequence and a level value sequence are obtained first. An obtaining method is described in step S101 of the foregoing embodiment. The run-length value sequence is N={$N_0$, $N_1$, $N_2$, . . . , $N_{m-1}$}, and the level value sequence is a={$a_0$, $a_1$, $a_2$, . . . , $a_{n-1}$}, where both m and n are positive integers. Each run-length value in the run-length value sequence corresponds to one value distribution probability, and each level value in the level value sequence corresponds to one value distribution probability.

Updated value distribution probabilities of level values are obtained based on value distribution probabilities of run-length values and value distribution probabilities of the level values and according to a preset mapping rule. The mapping rule is: mapping odd-numbered run-length values in the run-length value sequence to a first group of level values a1, and mapping even-numbered run-length values other than a run-length value numbered 0 in the run-length value sequence to a second group of level values a2, where level values in the first group of level values a1 are different from those in the second group of level values a2. Specifically, to fully utilize a dynamic range of the level values, a symmetric cross mapping method may be used to first map $N_0$ to a level value item $a_x$ with a largest distribution probability, then map a next item $N_1$ to the $1^{st}$ item on the right side of $a_x$, namely, $a_{x+1}$, then map a next item $N_2$ to the $1^{st}$ item on the left side of $a_x$, namely, $a_{x-1}$, and so on, to perform left-right cross mapping. Certainly, alternatively, $N_1$ may be first mapped to the $1^{st}$ item $a_{x-1}$ on the left side of $a_x$, and $N_2$ is mapped to the $1^{st}$ item $a_{x+1}$ on the right side of $a_x$, provided that an encoder and a decoder agree on a mapping regularity of left side first and right side second, or right side first and left side second. An advantage of this method lies in that an item with a large probability in a can be fully utilized. Compared with the foregoing method of mapping to one side of the item $a_x$ with the largest distribution probability, this method can further reduce an average length. It is also very convenient to perform demapping in decoding, provided that a symbol $a_x$ corresponding to a sequence with a smallest Huffman length needs to be found. According to a rule agreed on by the encoder and the decoder, $a_x$ originally in a position of a run-length value is mapped back to $N_0$, $a_{x+1}$ is mapped back to $N_1$, $a_{x-1}$ is mapped back to $N_2$, and so on.

In a specific embodiment, the run-length value $N_0$ is mapped to the level value $a_x$, where the level value $a_x$ is a level value with a largest distribution probability among the n values of the level values.

The odd-numbered run-length values in the run-length value sequence are mapped to the first group of level values a1, where sequence numbers of the first group of level values a1 in the level value sequence are less than x; the even-numbered run-length values other than the run-length value numbered 0 in the run-length value sequence are respectively mapped to the second group of level values a2, where sequence numbers of the second group of level values a2 in the level value sequence are greater than x, and x is a non-negative integer.

Alternatively, the even-numbered run-length values other than the run-length value numbered 0 in the run-length value sequence are respectively mapped to the first group of level values a1, where sequence numbers of the first group of level values a1 in the level value sequence are less than x; and the odd-numbered run-length values in the run-length value sequence are respectively mapped to the second group of level values a2, where sequence numbers of the second group of level values a2 in the level value sequence are greater than x, and x is a non-negative integer.

Figure 16:
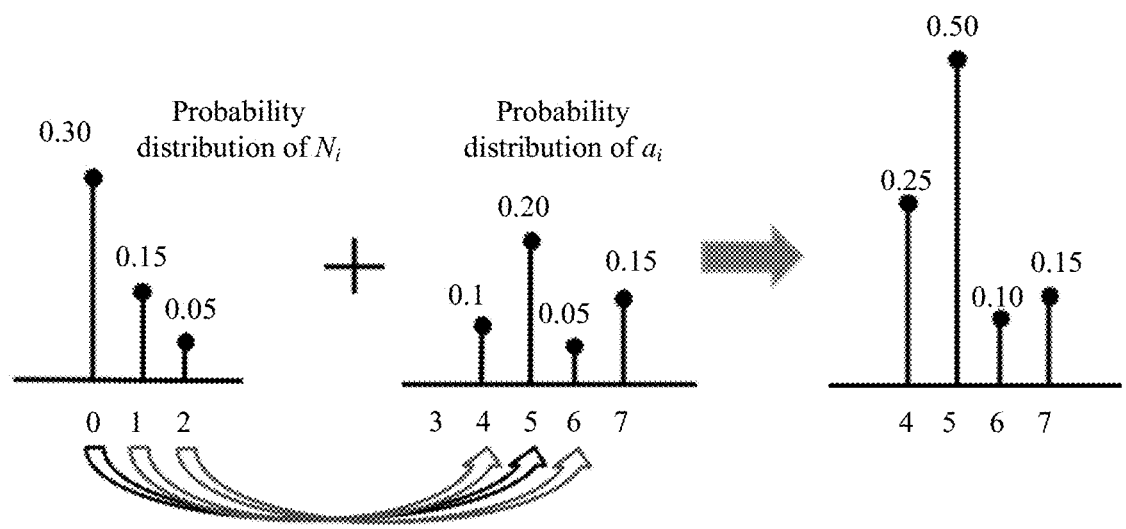
FIG. 16 is a schematic diagram of still another specific mapping rule based on the image encoding method.

FIG. 16 is a schematic diagram of still another specific mapping rule based on the image encoding method. Mapping is performed according to the foregoing method of symmetric crossing. A crossing order of left side first and right side second is used in the figure. Similarly, a run-length value sequence and a level value sequence are obtained first. The obtained run-length value sequence is N={0,1,2} and the obtained level value sequence is a={4,5,6,7}. A level value $a_x$=5 corresponding to a largest distribution probability in the level values is found. Therefore, a mapping relationship is obtained: 0 is mapped to 5, 1 is mapped to 4, and 2 is mapped to 6. An entire process is shown in FIG. 10. A level value sequence obtained after mapping is {4, 5, 6, 7}. Updated value distribution probabilities (a normalized distribution) of the level values {4, 5, 6, 7} are easily calculated: 0.25, 0.50, 0.10, and 0.15 (the probabilities of the raw run-length values and the raw level values in the figure have been processed for subsequent normalized distributions). It can be learned through calculation that a source entropy is 1.7427 bits, and an average length obtained after Huffman encoding is 1.7500. Similarly, a crossing order of right side first and left side second may be alternatively used. Details are not described herein.

Subsequent processing on polar run-length encoding is improved. It is noted that symbols before and after (N, a) in a run-length encoding result sequence have different distributions. Statistics are collected on distributions of the two parts of data separately, and then a plurality of methods are designed to effectively integrate the distributions. Integration schemes include: mapping according to a distribution regularity, mapping to the right side of a middle point, mapping to the left side of a middle point, and symmetric cross mapping. Finally, a data compression ratio is increased, and a corresponding mapping regularity results in little or no additional information. In addition, this technology may be extended to compression for a signal source with memory.

Figure 17:
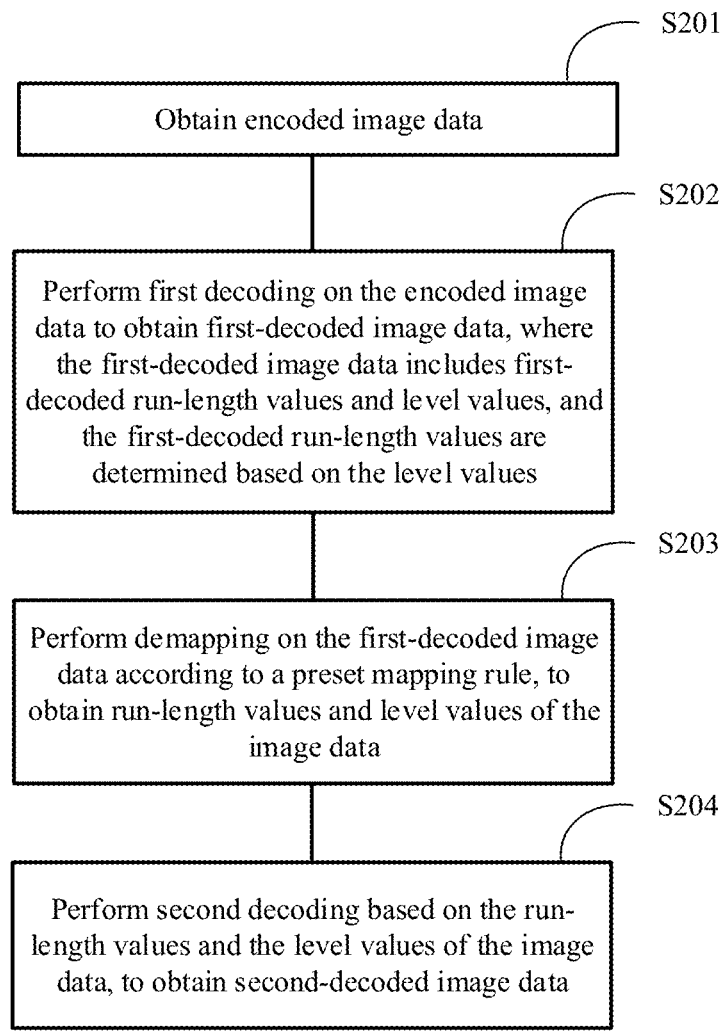
FIG. 17 is a flowchart of an image decoding method according to an embodiment of this application.

FIG. 17 is a flowchart of an image decoding method according to an embodiment of this application. The method includes the following steps.

S201. Obtain encoded image data.

S202. Perform first decoding on the encoded image data to obtain first-decoded image data, where the first-decoded image data includes first-decoded run-length values and level values, and the first-decoded run-length values are determined based on the level values.

S203. Perform demapping on the first-decoded image data according to a preset mapping rule, to obtain run-length values and level values of the image data.

S204. Perform second decoding based on the run-length values and the level values of the image data, to obtain second-decoded image data.

Specifically, a mapping relationship between the run-length values and the level values is determined based on a position of a level value $a_x$ in a level value sequence, where the level value $a_x$ is a level value with a largest distribution probability among n values of the level values.

Optionally, the preset mapping rule includes: mapping, in descending order of value distribution probabilities of the run-length values, the run-length values to the level values sorted in descending order of value distribution probabilities of the level values, to obtain updated value distribution probabilities of the level values.

Optionally, the preset mapping rule includes: mapping the run-length values to the level values in ascending or descending order of the run-length values in the run-length value sequence, to obtain updated value distribution probabilities of the level values.

Optionally, the preset mapping rule includes: mapping odd-numbered run-length values in the run-length value sequence to a first group of level values a1, and mapping even-numbered run-length values other than a run-length value numbered 0 in the run-length value sequence to a second group of level values a2, where level values in the first group of level values a1 are different from those in the second group of level values a2. For details about the mapping rule, refer to the foregoing mapping methods and examples described on the encoder side. Details are not described again.

According to a used entropy encoding method, a corresponding entropy decoding (entropy decoding) method is used on a decoder side. Huffman decoding (Huffman decoding) or arithmetic decoding (arithmetic decoding) is usually used in a system. In this embodiment of this application, Huffman decoding is used as an example, but use of other entropy decoding such as polar decoding (polar decoding) and low-density parity check decoding (LDPC decoding) is not excluded.

Figure 18:
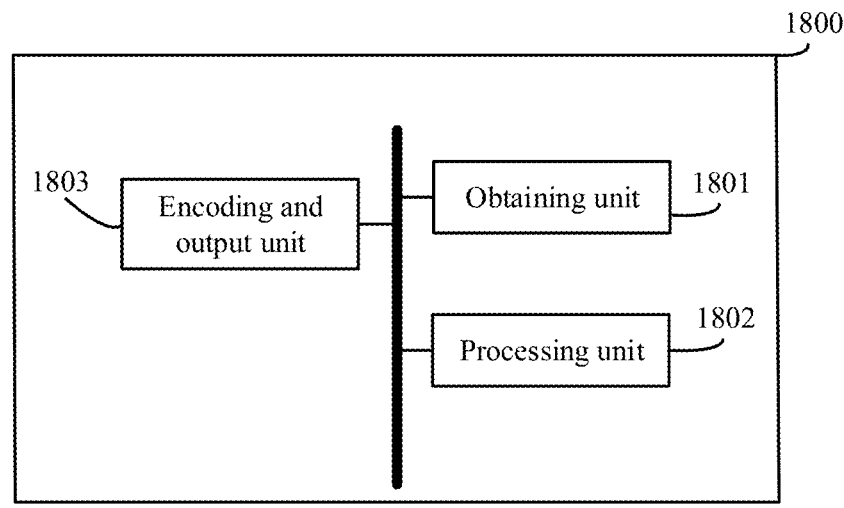
FIG. 18 shows an image encoding apparatus 1800 according to an embodiment of this application.

FIG. 18 shows an image encoding apparatus 1800 according to an embodiment of this application. The apparatus 1800 may be configured to perform the foregoing image encoding methods and specific embodiments. As shown in FIG. 18, the apparatus 1800 includes an obtaining unit 1801, a processing unit 1802, and an encoding and output unit 1803.

The obtaining unit 1801 is configured to: obtain a one-dimensional sequence of quantized coefficients of an image, where the one-dimensional sequence is obtained by scanning a two-dimensional matrix of the quantized coefficients; and obtain a run-length value sequence and a level value sequence based on the one-dimensional sequence of the coefficients, where the run-length value sequence is N={$N_0$, $N_1$, $N_2$, . . . , $N_{m-1}$}, the level value sequence is a={$a_0$, $a_1$, $a_2$, . . . , $a_{n-1}$}, both m and n are positive integers, each run-length value in the run-length value sequence corresponds to one distribution probability, and each level value in the level value sequence corresponds to one distribution probability.

The processing unit 1802 is configured to obtain updated value distribution probabilities of the level values based on the value distribution probabilities of the run-length values and the value distribution probabilities of the level values and according to a preset mapping rule.

The encoding and output unit 1803 is configured to: perform entropy encoding based on the level value sequence and the updated distribution probabilities of the level values to obtain and output encoded image data.

The encoding methods have been described in the foregoing specific embodiments, and the apparatus 1800 is merely configured to perform the encoding methods according to a program. Therefore, for specific descriptions of the encoding methods, and in particular, for the mapping rule preset in the processing unit 1802, refer to related parts of the embodiments corresponding to FIG. 7 to FIG. 16. Details are not described herein again.

Figure 19:
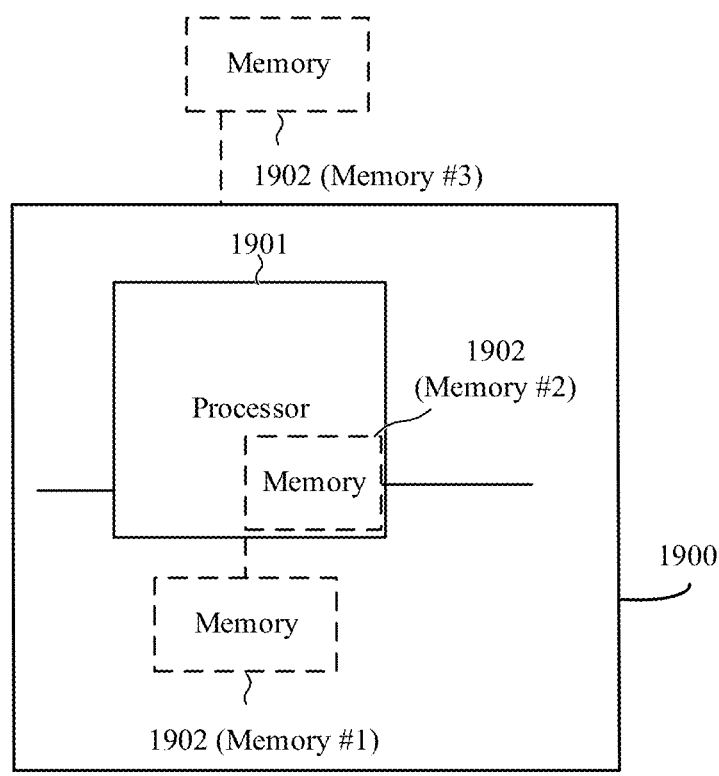
FIG. 19 shows an image encoding apparatus 1900 according to an embodiment of this application.

FIG. 19 shows an image encoding apparatus 1900 according to an embodiment of this application. The apparatus 1900 may be configured to perform the foregoing image encoding methods and specific embodiments. As shown in FIG. 19, the apparatus 1900 includes a processor 1901 and a memory 1902.

The memory 1902 is configured to store computer-readable instructions or a computer program. The processor 1901 is configured to read the computer-readable instructions or the computer program, to implement the encoding methods described in related parts of the embodiments corresponding to FIG. 7 to FIG. 19.

Optionally, the memory 1902 (Memory #1) may be independent of the processor 1901 or independent of the image encoding apparatus 1900 (Memory #3), or may be integrated into the processor 1901 (Memory #3).

Figure 20:
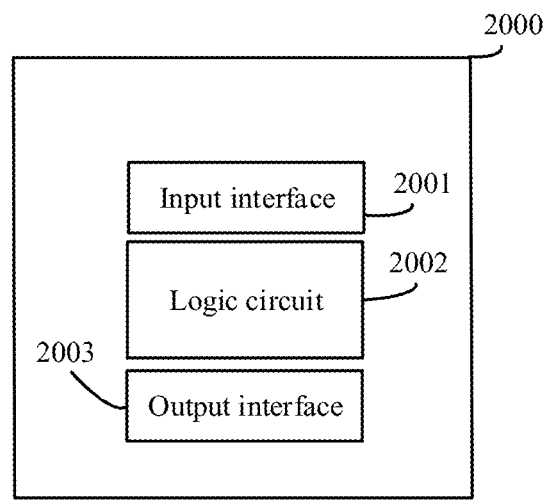
FIG. 20 shows an image encoding apparatus 2000 according to an embodiment of this application.

FIG. 20 shows an image encoding apparatus 2000 according to an embodiment of this application. The apparatus 2000 may be configured to perform the foregoing image encoding methods and specific embodiments. As shown in FIG. 20, the apparatus includes at least one input interface (input(s)) 2001, a logic circuit 2002, and at least one output interface (output(s)) 2003.

The at least one input interface 2001 is configured to: obtain a one-dimensional sequence of quantized coefficients of an image, where the one-dimensional sequence is obtained by scanning a two-dimensional matrix of the quantized coefficients; and obtain a run-length value sequence and a level value sequence based on the one-dimensional sequence of the coefficients, where the run-length value sequence is $N=\{N_0, N_1, N_2, \ldots, N_{m-1}\}$, the level value sequence is $a=\{a_0, a_1, a_2, \ldots, a_{n-1}\}$, both m and n are positive integers, each run-length value in the run-length value sequence corresponds to one distribution probability, and each level value in the level value sequence corresponds to one distribution probability.

The logic circuit 2002 is configured to: obtain updated value distribution probabilities of the level values based on the value distribution probabilities of the run-length values and the value distribution probabilities of the level values and according to a preset mapping rule, and perform entropy encoding based on the level value sequence and the updated distribution probabilities of the level values.

The output interface 2003 is configured to output encoded image data.

For the mapping rule preset in the logic circuit 2002 and other content, refer to the foregoing encoding methods.

Optionally, the logic circuit 2002 may be a chip, a graphics processing unit (GPU), an encoder, an encoding circuit, or another integrated circuit capable of implementing the image encoding methods in this application.

The encoding methods have been described in the foregoing method embodiments, and the apparatus 2000 is merely configured to perform the encoding methods. Therefore, for specific descriptions of the encoding methods, and in particular, for the mapping rule preset in the processing unit 1502, refer to related parts of corresponding embodiments. Details are not described herein again.

The image encoding apparatus 2000 shown in FIG. 20 may further include a memory (which is not shown in the figure), configured to store the encoded image data (a coding block) output by the output interface 2003.

Optionally, the image encoding apparatus in this application may be any device with an image processing function. Typically, the image encoding apparatus may be a mobile phone, a tablet computer, a portable notebook computer, a desktop computer, a workstation, a virtual/hybrid/augmented reality device, a navigation device, a smartwatch, an unmanned aerial vehicle, a handheld device/vehicle-mounted device/wearable device/system with an image collection and/or processing function, another image processing device in the future, or the like.

Optionally, the image encoding apparatus in this application may be alternatively a chip or an integrated circuit.

In the embodiments of this application, some units (or components) of the image encoding apparatus may be implemented by using a hardware circuit, and other units (or components) of the image encoding apparatus are implemented by using software; or all units (or components) of the image encoding apparatus may be implemented by using a hardware circuit; or all units (or components) of the image encoding apparatus are implemented by using software. The following image decoding apparatus has the same features, and is not described in detail again in the following descriptions.

Figure 21:
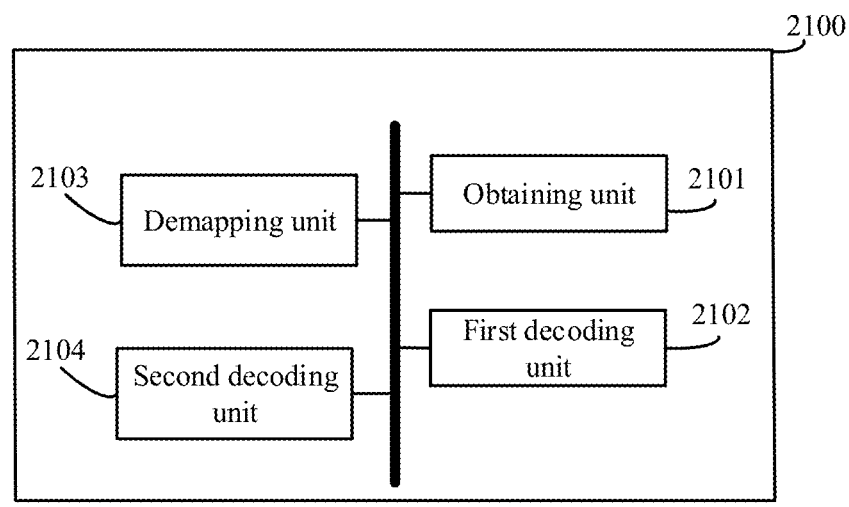
FIG. 21 shows an image decoding apparatus 2100 according to an embodiment of this application.

FIG. 21 shows an image decoding apparatus 2100 according to an embodiment of this application. The apparatus 2100 may be configured to perform the foregoing image decoding methods and specific embodiments. As shown in FIG. 21, the apparatus 2100 includes an obtaining unit 2101, a first decoding unit 2102, a demapping unit 2103, and a second decoding unit 2104.

The obtaining unit 2101 is configured to obtain encoded image data.

The first decoding unit 2102 is configured to perform first decoding on the encoded image data to obtain first-decoded image data, where the first-decoded image data includes first-decoded run-length values and level values, and the first-decoded run-length values are determined based on the level values.

The demapping unit 2103 is configured to perform demapping on the first-decoded image data according to a preset mapping rule, to obtain run-length values and level values of the image data.

The second decoding unit 2104 is configured to perform second decoding based on the run-length values and the level values of the image data, to obtain second-decoded image data.

The decoding methods have been described in the foregoing specific embodiments, and the apparatus 2100 is merely configured to perform the decoding methods according to a program. Therefore, for specific descriptions of the decoding methods, and in particular, for the mapping rule preset in the demapping unit 2103, refer to related parts of the embodiments corresponding to FIG. 7 to FIG. 16. Details are not described herein again.

Figure 22:
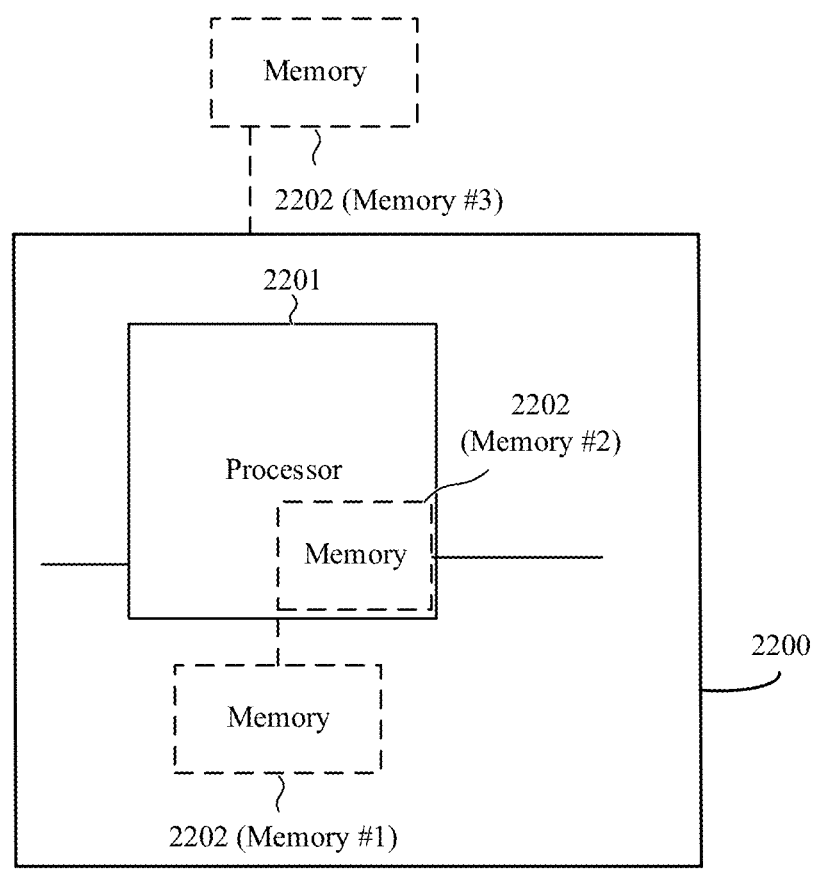
FIG. 22 shows an image decoding apparatus 2200 according to an embodiment of this application.

FIG. 22 shows an image decoding apparatus 2200 according to an embodiment of this application. The apparatus 2200 may be configured to perform the foregoing image decoding methods and specific embodiments. As shown in FIG. 22, the apparatus 2200 includes a processor 2201 and a memory 2202.

The memory 2202 is configured to store computer-readable instructions or a computer program. The processor 2201 is configured to read the computer-readable instructions or the computer program, to implement the decoding method described in related parts of the embodiments.

Optionally, the memory 2202 (Memory #1) may be independent of the processor 2201 or independent of the image decoding apparatus 2200 (Memory #3), or may be integrated into the processor 2201 (Memory #2).

Figure 23:
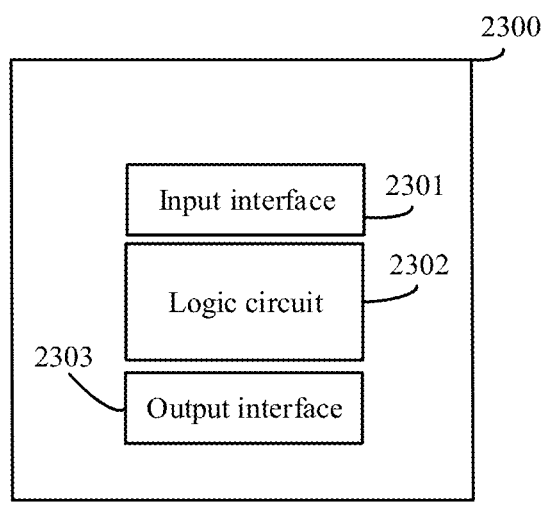
FIG. 23 shows an image decoding apparatus 2300 according to an embodiment of this application.

FIG. 23 shows an image decoding apparatus 2300 according to an embodiment of this application. The apparatus 2300 may be configured to perform the foregoing image decoding methods and specific embodiments. As shown in FIG. 23, the apparatus includes at least one input interface (input(s)) 2301, a logic circuit 2302, and at least one output interface (output(s)) 2303.

The at least one input interface 2301 is configured to obtain encoded image data.

The logic circuit 2302 is configured to: perform first decoding on the encoded image data to obtain first-decoded image data, where the first-decoded image data includes first-decoded run-length values and level values, and the first-decoded run-length values are determined based on the level values; perform demapping on the first-decoded image data according to a preset mapping rule, to obtain run-length values and level values of the image data; and perform second decoding based on the run-length values and the level values of the image data, to obtain second-decoded image data.

The output interface 2303 is configured to output the second-decoded image data.

Optionally, the logic circuit 2302 may be a chip, a graphics processing unit (GPU), a decoder, a decoding circuit, or another integrated circuit capable of implementing the image decoding methods in this application.

The decoding methods have been described in the foregoing method embodiments, and the apparatus 2300 is merely configured to perform the decoding methods. Therefore, for specific descriptions of the decoding methods, and in particular, for the mapping rule preset in the processing unit 1502, refer to related parts of corresponding embodiments. Details are not described herein again.

The image decoding apparatus 2300 shown in FIG. 23 may further include a display (which is not shown in the figure), configured to display a decoded image output by the output interface 2303.

Optionally, the image decoding apparatus in this application may be any device with an image processing function. This is the same as that of the encoding apparatus, and details are not described again.

Optionally, the image decoding apparatus in this application may be alternatively a chip or an integrated circuit.

An embodiment of this application provides a computer-readable medium. The computer-readable medium stores computer program instructions. When the computer program instructions are executed by a computer, the method in any one of the foregoing embodiments is implemented.

An embodiment of this application provides a computer program product. When the computer program product is executed by a computer, the method in any one of the foregoing embodiments is implemented.

An embodiment of this application provides a computer program. When the computer program product is executed by a computer, the method in any one of the foregoing embodiments is implemented.

In actual use, the encoding apparatus and the decoding apparatus described in the embodiments of this application may be independent devices, or may be an integrated device, configured to: perform compression processing on obtained image data, and further store processed image data into a memory; or obtain encoded image data, perform image decoding, and further display a decoded image on a display of the apparatus.

In the examples described in the embodiments of this application, units and method processes may be implemented by electronic hardware or a combination of computer software and electronic hardware. Whether the functions are performed by hardware or software depends on particular applications and design constraints of the technical solutions. A person skilled in the art may use different methods to implement the described functions for each specific application.

In the embodiments provided in this application, it should be understood that the disclosed apparatuses and methods may be implemented in other manners. For example, the described apparatus embodiments are merely examples. For example, division into the units is merely logical function division, or may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and components displayed as units may or may not be physical units, may be located in one position, or may be distributed on a plurality of network units. Some or all of the units may be selected depending on actual requirements to achieve the objectives of the solutions in the embodiments.

In addition, the functional units in the embodiments of this application may be integrated into one processing unit, or each of the units may exist alone physically, or two or more units may be integrated into one unit. The integrated unit may be implemented in a form of hardware, or may be implemented in a form of hardware and a software functional unit.

When the functions are implemented in a form of a software function unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application.

What is claimed is:

1. An image encoding method, wherein the method comprises:

obtaining a one-dimensional sequence of quantized coefficients of an image, wherein the one-dimensional sequence is obtained by scanning a two-dimensional matrix of quantized coefficients;

obtaining a run-length value sequence and a level value sequence based on the one-dimensional sequence of the quantized coefficients, wherein the run-length value sequence is $N=\{N_0, N_1, N_2, \ldots, N_{m-1}\}$, the level value sequence is $a=\{a_0, a_1, a_2, \ldots, a_{n-1}\}$, both m and n are positive integers, and wherein each run-length value in the run-length value sequence has a one-to-one correspondence to one of m first distribution probabilities and each level value in the level value sequence has a one-to-one correspondence to one of n second distribution probabilities;

obtaining an updated second distribution probability of each level value in the level value sequence based on the m first distribution probabilities, the n second distribution probabilities, and a preset mapping rule; and performing encoding based on the level value sequence and the updated second distribution probability of each level value in the level value sequence to obtain and output encoded image data.

2. The method according to claim 1, wherein obtaining the updated second distribution probability comprises:
mapping a run-length value $N_u$ with a largest distribution probability among m values in the run-length value sequence to a level value $a_x$ with a largest distribution probability among n values in the level value sequence, to obtain an updated second distribution probability of the level value $a_x$, wherein u and x are non-negative integers.

3. The method according to claim 2, wherein the method further comprises:
respectively mapping run-length values to level values based on a position of the level value $a_x$ in the level value sequence, to obtain the updated second distribution probability of each level value in the level value sequence.

4. The method according to claim 1, wherein the preset mapping rule comprises:
mapping, in descending order of first distribution probabilities of run-length values, the run-length values to level values sorted in descending order of the n second distribution probabilities of level values in the level value sequence, to obtain the updated second distribution probability of each level value in the level value sequence.

5. The method according to claim 4, wherein
a run-length value sequence $N_0', N_1', N_2', \ldots, N_{m-1}'$ sorted based on the m first distribution probabilities is obtained in descending order of the m first distribution probabilities; a level value sequence $a_0', a_1', a_2', \ldots, a_{n-1}'$ sorted based on the n second distribution probabilities is obtained in descending order of the n second distribution probabilities, wherein m and n are positive integers; and when m is less than n, run-length values $N_m', N_{m+1}', N_{m+2}', \ldots, N_{n-1}'$ are created, them first distribution probabilities corresponding to the run-length values $N_m', N_{m+1}', N_{m+2}', \ldots, N_{n-1}'$ are all 0s, a run-length value $N_i'$ is mapped to a level value $a_i'$, $i \in [0, n-1]$, and i is an integer; or when m is greater than n, level values $a_n', a_{n+1}', a_{n+2}', \ldots, a_m'$ are created, the n second distribution probabilities corresponding to the level values $a_n', a_{n+1}', a_{n+2}', \ldots, a_m'$ are all 0s, a run-length value $N_i'$ is mapped to a level value $a_i'$, $i \in [0, m-1]$, and i is an integer; or when m is equal to n, a run-length value $N_i'$ is mapped to a level value $a_i'$, $i \in [0, n-1]$, and i is an integer; and updated second distribution probabilities are obtained; or
a run-length value sequence $N_0', N_1', N_2', \ldots, N_{m-1}'$ sorted based on the m first distribution probabilities is obtained in descending order of the m first distribution probabilities; a level value sequence $a_0', a_1', a_2', \ldots, a_{n-1}'$ sorted based on the n second distribution probabilities is obtained in descending order of the n second distribution probabilities, wherein m and n are positive integers; and when m is less than n, a run-length value $N_i'$ is mapped to a level value $a_i'$, $i \in [0, m-1]$, i is an integer, a second distribution probability of a level value in the level value sequence to which no run-length value is mapped remains unchanged; or when m is greater than n, a run-length value $N_i'$ is mapped to a level value $a_i'$, $i \in [0, n-1]$, i is an integer, a first distribution probability of a run-length value that is not mapped remains unchanged, and the run-length value that is not mapped is added to the level value sequence; or when m is equal to n, a run-length value $N_i'$ is mapped to a level value $a_i'$, $i \in [0, n-1]$, and i is an integer; and updated second distribution probability of each level value in the level value sequence is obtained.

6. The method according to claim 1, wherein the preset mapping rule comprises:
mapping run-length values to level values in ascending or descending order of the run-length values in the run-length value sequence, to obtain the updated second distribution probability of each level value in the level value sequence.

7. The method according to claim 6, wherein
when m is less than or equal to (n−x), the run-length value $N_i$ is mapped to a level value $a_{x+i}$, wherein the level value $a_x$ is a level value with a largest distribution probability among the n values of the level values, $i \in [0, m-1]$, i is an integer, x is a non-negative integer, and a distribution probability of a level value to which no run-length value is mapped remains unchanged; or when m is greater than (n−x), the run-length value $N_i$ is mapped-to the level value $a_{x+i}$, wherein the level value $a_x$ is a level value with a largest distribution probability among the n values of the level values, $i \in [0, n-x]$, i is an integer, x is a non-negative integer, a distribution probability of a run-length value that is not mapped remains unchanged, the run-length value that is not mapped is added to the level value sequence, and a distribution probability of a level value to which no run-length value is mapped remains unchanged; and the updated second distribution probability of each level value in the level value sequence are obtained; or
when m is less than or equal to (x+1), the run-length value $N_i$ is mapped to a level value $a_{x-i}$, wherein the level value $a_x$ is a level value with a largest distribution probability among the n values of the level values, $i \in [0, m-1]$, i is an integer, x is a non-negative integer, and a distribution probability of a level value to which no run-length value is mapped remains unchanged; or when m is greater than (x+1), the run-length value $N_i$ is mapped to the level value $a_{x-i}$, wherein the level value $a_x$ is a level value with a largest distribution probability among the n values of the level values, $i \in [0, x+1]$, i is an integer, x is a non-negative integer, a distribution probability of a run-length value that is not mapped remains unchanged, the run-length value that is not mapped is added to the level value sequence, and a distribution probability of a level value to which no run-length value is mapped remains unchanged; and the updated second distribution probability of each level value in the level value sequence are obtained.

8. The method according to claim 1, wherein the preset mapping rule comprises:
mapping odd-numbered run-length values in the run-length value sequence to a first group of level values, and mapping even-numbered run-length values other than a run-length value numbered 0 in the run-length value sequence to a second group of level values, wherein level values in the first group of level values are different from those in the second group of level values.

9. The method according to claim 8, wherein
the run-length value $N_0$ is mapped to a level value $a_x$, wherein the level value $a_x$ is a level value with a largest distribution probability among the n values of the level values; and the odd-numbered run-length values in the run-length value sequence are respectively mapped to the first group of level values, wherein sequence numbers of the first group of level values in the level value sequence are less than x; and the even-numbered run-length values other than the run-length value numbered 0 in the run-length value sequence are respectively mapped to the second group of level values, wherein sequence numbers of the second group of level values in the level value sequence are greater than x, and x is a non-negative integer; or the even-numbered run-length values other than the run-length value numbered 0 in the run-length value sequence are respectively mapped to the first group of level values, wherein sequence numbers of the first group of level values in the level value sequence are less than x; and the odd-numbered run-length values in the run-length value sequence are respectively mapped to the second group of level values, wherein sequence numbers of the second group of level values in the level value sequence are greater than x, and x is a non-negative integer.

10. An image encoding apparatus, comprising at least one processor, and one or more memories store programming instruction for execution by the at least one processor to:

obtain a one-dimensional sequence of quantized coefficients of an image, wherein the one-dimensional sequence is obtained by scanning a two-dimensional matrix of quantized coefficients;

obtain a run-length value sequence and a level value sequence based on the one-dimensional sequence of the quantized coefficients, wherein the run-length value sequence is $N=\{N_0, N_1, N_2, \ldots, N_{m-1}\}$, the level value sequence is $a=\{a_0, a_1, a_2, \ldots, a_{n-1}\}$, both m and n are positive integers, and wherein each run-length value in the run-length value sequence has a one-to-one correspondence to one of m first distribution probabilities and each level value in the level value sequence has a one-to-one correspondence to one of n second distribution probabilities;

obtain an updated second distribution probability of each level value in the level value sequence based on them first distribution probabilities, the n second distribution probabilities, a preset mapping rule;

perform entropy encoding based on the level value sequence and the updated second distribution probability of each level value in the level value sequence; and output encoded image data.

11. The image encoding apparatus according to claim 10, wherein the preset mapping rule comprises:

mapping a run-length value $N_u$ with a largest distribution probability among m values in the run-length value sequence to a level value $a_x$ with a largest distribution probability among n values in the level value sequence, to obtain an updated second distribution probability of the level value $a_x$, wherein u and x are non-negative integers.

12. The image encoding apparatus according to claim 11, wherein run-length values are respectively mapped to level values based on a position of the level value $a_x$ in the level value sequence, to obtain the updated second distribution probability probabilities of each level value in the level value sequence.

13. The image encoding apparatus according to claim 10, wherein the preset mapping rule comprises:

mapping, in descending order of the m first distribution probabilities of run-length values, the run-length values to level values sorted in descending order of the n second distribution probabilities of level values in the level value sequence, to obtain the updated second distribution probability of each level value in the level value sequence.

14. The image encoding apparatus according to claim 10, wherein the preset mapping rule comprises:

mapping run-length values to level values in ascending or descending order of the run-length values in the run-length value sequence, to obtain the updated second distribution probability of each level value in the level value sequence.

15. The image encoding apparatus according to claim 10, wherein the preset mapping rule comprises:

mapping odd-numbered run-length values in the run-length value sequence to a first group of level values, and mapping even-numbered run-length values other than a run-length value numbered 0 in the run-length value sequence to a second group of level values, wherein level values in the first group of level values are different from those in the second group of level values.

16. A non-transitory computer-readable storage medium, storing one or more programming instructions, that when executed by at least one processor, cause the at least one processor to:

obtain a one-dimensional sequence of quantized coefficients of an image, wherein the one-dimensional sequence is obtained by scanning a two-dimensional matrix of quantized coefficients;

obtain a run-length value sequence and a level value sequence based on the one-dimensional sequence of the quantized coefficients, wherein the run-length value sequence is $N=\{N_0, N_1, N_2, \ldots, N_{m-1}\}$, the level value sequence is $a=\{a_0, a_1, a_2, \ldots, a_{n-1}\}$, both m and n are positive integers, and wherein each run-length value in the run-length value sequence has a one-to-one correspondence to one of m first distribution probabilities and each level value in the level value sequence has a one-to-one correspondence to one of n second distribution probabilities;

obtain an updated second distribution probability of each level value in the level value sequence based on the m first distribution probabilities, the n second distribution probabilities, and a preset mapping rule; and perform encoding based on the level value sequence and the updated second distribution probability of each level value in the level value sequence to obtain and output encoded image data.

17. The computer-readable storage medium according to claim 16, wherein the preset mapping rule comprises:

mapping a run-length value $N_u$ with a largest distribution probability among m values in the run-length value sequence to a level value $a_x$ with a largest distribution probability among n values in the level value sequence, to obtain an updated second distribution probability of the level value $a_x$, wherein u and x are non-negative integers.

18. The computer-readable storage medium according to claim 16, wherein the preset mapping rule comprises:

mapping, in descending order of the m first distribution probabilities of run-length values, the run-length values to level values sorted in descending order of the n second distribution probabilities of level values in the level value sequence, to obtain the updated second distribution probability of each level value in the level value sequence.

19. The computer-readable storage medium according to claim 16, wherein the preset mapping rule comprises:
mapping run-length values to level values in ascending or descending order of the run-length values in the run-length value sequence, to obtain the updated second distribution probability of each level value in the level value sequence.

20. The computer-readable storage medium according to claim 16, wherein the preset mapping rule comprises:
mapping odd-numbered run-length values in the run-length value sequence to a first group of level values, and mapping even-numbered run-length values other than a run-length value numbered 0 in the run-length value sequence to a second group of level values, wherein level values in the first group of level values are different from those in the second group of level values.

* * * * *